(12) United States Patent
Wulich et al.

(10) Patent No.: US 8,995,295 B2
(45) Date of Patent: Mar. 31, 2015

(54) USING MAXIMAL SUM-RATE MUTUAL INFORMATION TO OPTIMIZE JCMA CONSTELLATIONS

(75) Inventors: Dov Wulich, Meitar (IL); Gill Raphael Tsouri, Rochester, NY (US); Ron Dabora, Tel Aviv (IL)

(73) Assignee: Signext Wireless Ltd., Yavne (IL)

( * ) Notice: Subject to any disclaimer, the term of this patent is extended or adjusted under 35 U.S.C. 154(b) by 4 days.

(21) Appl. No.: 13/508,369

(22) PCT Filed: Nov. 4, 2010

(86) PCT No.: PCT/IB2010/054991
§ 371 (c)(1),
(2), (4) Date: May 7, 2012

(87) PCT Pub. No.: WO2011/055319
PCT Pub. Date: May 12, 2011

(65) Prior Publication Data
US 2012/0287801 A1   Nov. 15, 2012

Related U.S. Application Data

(60) Provisional application No. 61/258,328, filed on Nov. 5, 2009.

(51) Int. Cl.
*H04L 5/02* (2006.01)
*H04L 27/34* (2006.01)
*H04W 52/02* (2009.01)
*H04W 52/22* (2009.01)
*H04W 52/36* (2009.01)

(52) U.S. Cl.
CPC .................. *H04L 27/3461* (2013.01)
USPC ........... 370/252; 370/480; 370/498; 375/260; 375/261; 375/267; 375/295; 375/299

(58) Field of Classification Search
USPC ......... 370/299, 480, 498, 315–326, 328–330, 370/400–401; 455/11.1–13.4; 375/260, 375/261, 267, 295, 299
IPC ............... H04L 27/00,27/26, 27/28; H04J 1/00, H04J 3/00
See application file for complete search history.

(56) References Cited

U.S. PATENT DOCUMENTS

| | | | | |
|---|---|---|---|---|
| 2006/0019602 | A1* | 1/2006 | Ionescu et al. ................... | 455/10 |
| 2007/0286238 | A1* | 12/2007 | Wang et al. .................... | 370/478 |
| 2008/0175183 | A1* | 7/2008 | Devroye et al. ............... | 370/315 |
| 2009/0135926 | A1* | 5/2009 | Tsouri et al. .................. | 375/260 |
| 2009/0232074 | A1* | 9/2009 | Yang et al. .................... | 370/329 |

OTHER PUBLICATIONS

WO 2007/039908—Joint Constellation Multiple Access.*
Magus Borga, A Piece of Information, Oct. 29, 1999.*
(Continued)

*Primary Examiner* — Andrew Chriss
*Assistant Examiner* — John Lequang
(74) *Attorney, Agent, or Firm* — Daniel J. Swirsky; AlphaPatent Associates Ltd.

(57) ABSTRACT

A method and a system for calculating a JCMA constellation for use in a JCMA communication system where the method includes a step of using maximum sum-rate mutual information criterion to select an optimal JCMA constellation for the number of transmitters N, SNR and modulation schemes used by the transmitters.

40 Claims, 15 Drawing Sheets

(56) References Cited

OTHER PUBLICATIONS

Dongning Guo—Gaussian Channels: Information, Estimation and Multiuser Detection, Nov. 2004.*

WO 2007-039908—Joint Constellation Multiple Access.*
G. R. Tsouri and D. Wulich, "Securing OFDM over Wireless Time-Varying Channels using Sub-Carrier Over-Loading with Joint Signal Constellations", Eurasip Journal on Wireless Communications & Networking, 2009, Article ID 437824, doi:10.1155/2009/437824.

* cited by examiner ized SM
USING MAXIMAL SUM-RATE MUTUAL INFORMATION TO OPTIMIZE JCMA CONSTELLATIONS

CROSS-REFERENCE TO RELATED APPLICATIONS

This application is a U.S. National Phase Application under 35 U.S.C. 371 of PCT International Application No. PCT/IB2010/054991 which has an international filing date of Nov. 4, 2010, and which claims priority benefit of U.S. Provisional Patent Application No. 61/258,328, filed Nov. 5, 2009, which is incorporated herein by reference.

FIELD AND OF THE INVENTION

The present invention generally relates to communication systems and methods, and, more particularly, but not exclusively to methods and systems for multiple access communications.

BACKGROUND OF THE INVENTION

The proliferation of wireless communication interfaces in mobile and stationary devices rendered the frequency spectrum scarce. Efficient use of allocated bandwidth for communication is a critical issue for the viability of wireless communication systems.

Frequency Division Multiple Access (FDMA) is a widely used method for allowing multiple transmitters access to a common wireless channel. An example is cellular telephony where multiple mobile users access the same base station. Specifically, FDMA was recently adopted for uplink in the Long Term Evolution (LTE) extension of the Universal Mobile Telecommunication Systems (UMTS) standard.

The use of Joint Constellation Multiple Access (JCMA) is known. US patent application 20090135926 is believed to represent the most relevant prior art. US patent application 20090135926 is incorporated herein by reference The following documents are believed to represent further relevant prior art:
- J. G. Proakis, Digital Communication, McGraw Hill, 3rd edition, 1995.
- T. M. Cover and J. Thomas. Elements of Information Theory. John Wiley and Sons Inc., second edition, 2006.
- A. Goldsmith, Wireless Communications, Cambridge University Press, 2006.
- C. Johnson, Radio Access Networks for UMTS, Wiley, 2008.
- G. R. Tsouri and D. Wulich, "Securing OFDM over Wireless Time-Varying Channels using Sub-Carrier Over-Loading with Joint Signal Constellations", Eurasip Journal on Wireless Communications & Networking, 2009.

In the classical FDMA approach the total frequency spectrum is divided into sub-bands. The receiver allocates a subband to each transmitter, and each transmitter has exclusive use of its allocated sub-band. This converts the allocated total bandwidth into a set of orthogonal channels connecting the transmitters and receiver.

JCMA suggests coupling N multiple transmitters under a Superposition Modulation (SM) scheme. This allows the joining of their multiple sub-bands to a single sub-band N times larger than an original sub-band. The large bandwidth would allow transmission at a rate N times larger than the original rate. However, the energy per transmitted symbol would decrease by a factor of N as well, resulting in an increase of the Bit Error Rate (BER) upon decoding at the receiver. The increase in BER would be mitigated by applying source coding prior to transmission and by synchronizing the transmitters to form a superimposed constellation which is robust to noise at the receiver. Applying coding would result in throughput decrease. If the decrease in throughput due to coding is less than the increase in transmission rate due to bandwidth expansion, the throughput with synchronized SM would be larger than the throughput of classical FDMA.

As described above, JCMA is based on synchronous Superposition Modulation (SM) and coding for increasing the spectral efficiency of practical FDMA systems. SM is known to achieve maximal aggregated capacity. However, SM is largely avoided under the premise that capacity increase offered by SM is not substantial compared to the complexity involved in obtaining accurate synchronization and power control required for its operation.

There is thus a recognized need for, and it would be highly advantageous to have, a communication system, and particularly a JCMA communication system having increased capacity, preferably by optimizing the immunity of the constellation used to SNR.

SUMMARY OF THE INVENTION

According to one aspect of the present invention there is provided a method for calculating a JCMA constellation for use in a JCMA communication system where the method includes a step of using maximum sum-rate mutual information criterion.

According to another aspect of the present invention there is provided a method for calculating a JCMA constellation including calculating the maximum mutual information according to:

$$I(X;Y) = \int_{x \in X} \int_{y \in Y} p(x,y) \log_2 \frac{p(x,y)}{p(x)p(y)} dx dy,$$

where X is a transmitter transmitting at least a part of the JCMA constellation and Y is a receiver receiving the JCMA constellation, where I(X, Y) is the mutual information function, and where p(x, y) is the joint probability density function for X and Y, and p(·) is the marginal probability density functions for X and Y respectively.

According to still another aspect of the present invention there is provided a method for calculating a JCMA constellation including calculating the maximum sum-rate mutual information according to:

$$[P, \theta] = \mathrm{argmax}_{P_n \in [0,1], \theta_n \in [0,180°], n=1,2,\ldots,N} I(X_1, X_2, \ldots, X_N; Y),$$

where N is the number of transmitters using the constellation, where $P_n$ is the average transmission power for transmitter n, where $\theta_n$ right rotation of the constellation for transmitter n, where I is the mutual information function, where $X_n$ is the transmitted constellation for transmitter n, and where Y is the receiver.

According to yet another aspect of the present invention there is provided a method for calculating a JCMA constellation including selecting the JCMA constellation from a plurality of JCMA constellations where for the selected JCMA constellation the value of S is maximal, where S is given by:

$$S[\underline{x}^{(1)}, \underline{x}^{(2)}, \ldots, \underline{x}^{(N)}] = \sum_{n=1}^{N} I_n(\underline{x}^{(n)}),$$

where $$I_n(\underline{x}^{(n)}) = \sum_{i=1}^{M} \int_{-\infty}^{\infty} p(y/x_i^{(n)}) P(x_i^{(n)}) \log_2 \frac{p(y/x_i^{(n)})}{p(y)} \, dy,$$

and where $$p(y/x_i^{(n)}) = \frac{1}{\sqrt{2\pi\sigma^2}} \exp\left\{-\frac{(y - x_i^{(n)})^2}{2\sigma^2}\right\}$$

Further according to another aspect of the present invention there is provided a method for calculating a JCMA constellation where the constellation calculated using the maximum sum-rate mutual information criterion provides at least one of: optimal spectral efficiency, optimal bit-rate, and optimal transmission power.

Still further according to another aspect of the present invention there is provided a method for calculating a JCMA constellation the method additionally including the steps of: using the maximum sum-rate mutual information criterion, calculating a plurality of JCMA constellations, where each constellation is optimal for a combination including at least two of: a number of transmitters participating in the JCMA constellation, a value of Signal-to-Noise Ratio (SNR) at a receiver of the JCMA constellation, and at least one modulation scheme.

Yet further according to another aspect of the present invention there is provided a method for calculating a JCMA constellation, the method additionally including the step of distributing the plurality of JCMA constellations to at least one of a receiver and a transmitter.

Even further according to another aspect of the present invention there is provided a method for calculating a JCMA constellation, the method including the steps of: at a receiver of the JCMA constellation performing the steps of: selecting a plurality of transmitters to form a group of transmitters for jointly transmitting a JCMA constellation, measuring the combined SNR value for the group of transmitters, selecting a JCMA constellation from the plurality of JCMA constellations according to at least two of: the number N of transmitters in the group of transmitters, the SNR value, and at least one modulation scheme, and informing the selected constellation the to the group of transmitters.

Additionally according to another aspect of the present invention there is provided a method for calculating a JCMA constellation where the step of selecting a JCMA constellation includes calculating the JCMA constellation using the maximum sum-rate mutual information criterion at the receiver.

Also according to another aspect of the present invention there is provided a method for calculating a JCMA constellation where the step of selecting a JCMA constellation includes the steps of: calculating a plurality of the JCMA constellations offline, using the maximum sum-rate mutual information criterion, distributing the plurality of JCMA constellations to at least one of a receiver and a transmitter, and in at least one of the receiver and the transmitter, selecting a JCMA constellation from the plurality of JCMA constellations according to at least two of: a number N of transmitters in a group of transmitters, the SNR value, and at least one modulation scheme.

Further according to another aspect of the present invention there is provided a method for calculating a JCMA constellation, the method including the steps of: receiving a constellation from the receiver, receiving a pilot signal from the receiver, calculating at a transmitter of the group of transmitters at least one of transmission power P and constellation rotation angle θ according to the pilot signal, and transmitting at least one JCMA constellation component to the receiver using the P and the θ.

Still further according to another aspect of the present invention there is provided a method for calculating a JCMA constellation, where the receiver is at least one of a basestation, an access point, a satellite, and a satellite ground station.

Yet further according to another aspect of the present invention there is provided a communication system using the method for calculating a JCMA constellation according to the maximal sum-rate mutual information criterion.

Even further according to another aspect of the present invention there is provided a receiver in a JCMA communication system using the method for calculating a JCMA constellation according to the maximal sum-rate mutual information criterion.

Additionally according to another aspect of the present invention there is provided a receiver in a JCMA communication system where the receiver is at least one of a basestation, an access point, a satellite, and a satellite ground station.

Also according to another aspect of the present invention there is provided a transmitter in a JCMA communication system using the method for calculating a JCMA constellation according to the maximal sum-rate mutual information criterion.

Further according to another aspect of the present invention there is provided a method of communication including the steps of: sending a pilot signal from a receiver to a group of transmitters, receiving the pilot signal by at least one of the receivers, calculating power level and rotation angle in the transmitter according to the pilot signal, and sending a data signal from the transmitter to the receiver using the calculated power level and rotation angle, where the pilot signal is transmitted at a power level calculated at the receiver according to a number of transmitters in the group of transmitters.

Yet further according to another aspect of the present invention there is provided a receiver in a communication system using the method of communication including the steps of: sending a pilot signal from a receiver to a group of transmitters, receiving the pilot signal by at least one of the receivers, calculating power level and rotation angle in the transmitter according to the pilot signal, and sending a data signal from the transmitter to the receiver using the calculated power level and rotation angle, where the pilot signal is transmitted at a power level calculated at the receiver according to a number of transmitters in the group of transmitters.

Yet further according to another aspect of the present invention there is provided a receiver in a communication system using the method of communication including the steps of: sending a pilot signal from a receiver to a group of transmitters, receiving the pilot signal by at least one of the receivers, calculating power level and rotation angle in the transmitter according to the pilot signal, and sending a data signal from the transmitter to the receiver using the calculated power level and rotation angle, where the pilot signal is transmitted at a power level calculated at the receiver according to a number of transmitters in the group of transmitters, and where the receiver is at least one of a base-station, an access point, a satellite, and a satellite ground station.

Even further according to another aspect of the present invention there is provided a non-transitory computer readable media including JCMA constellations calculated using maximum sum-rate mutual information criterion.

Unless otherwise defined, all technical and scientific terms used herein have the same meaning as commonly understood by one of ordinary skill in the art to which this invention belongs. The materials, methods, and examples provided herein are illustrative only and not intended to be limiting. Except to the extend necessary or inherent in the processes themselves, no particular order to steps or stages of methods and processes described in this disclosure, including the figures, is intended or implied. In many cases the order of process steps may vary without changing the purpose or effect of the methods described.

Implementation of the method and system of the present invention involves performing or completing certain selected tasks or steps manually, automatically, or any combination thereof. Moreover, according to actual instrumentation and equipment of preferred embodiments of the method and system of the present invention, several selected steps could be implemented by hardware or by software on any operating system of any firmware or any combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF THE INVENTION

Figure 1:
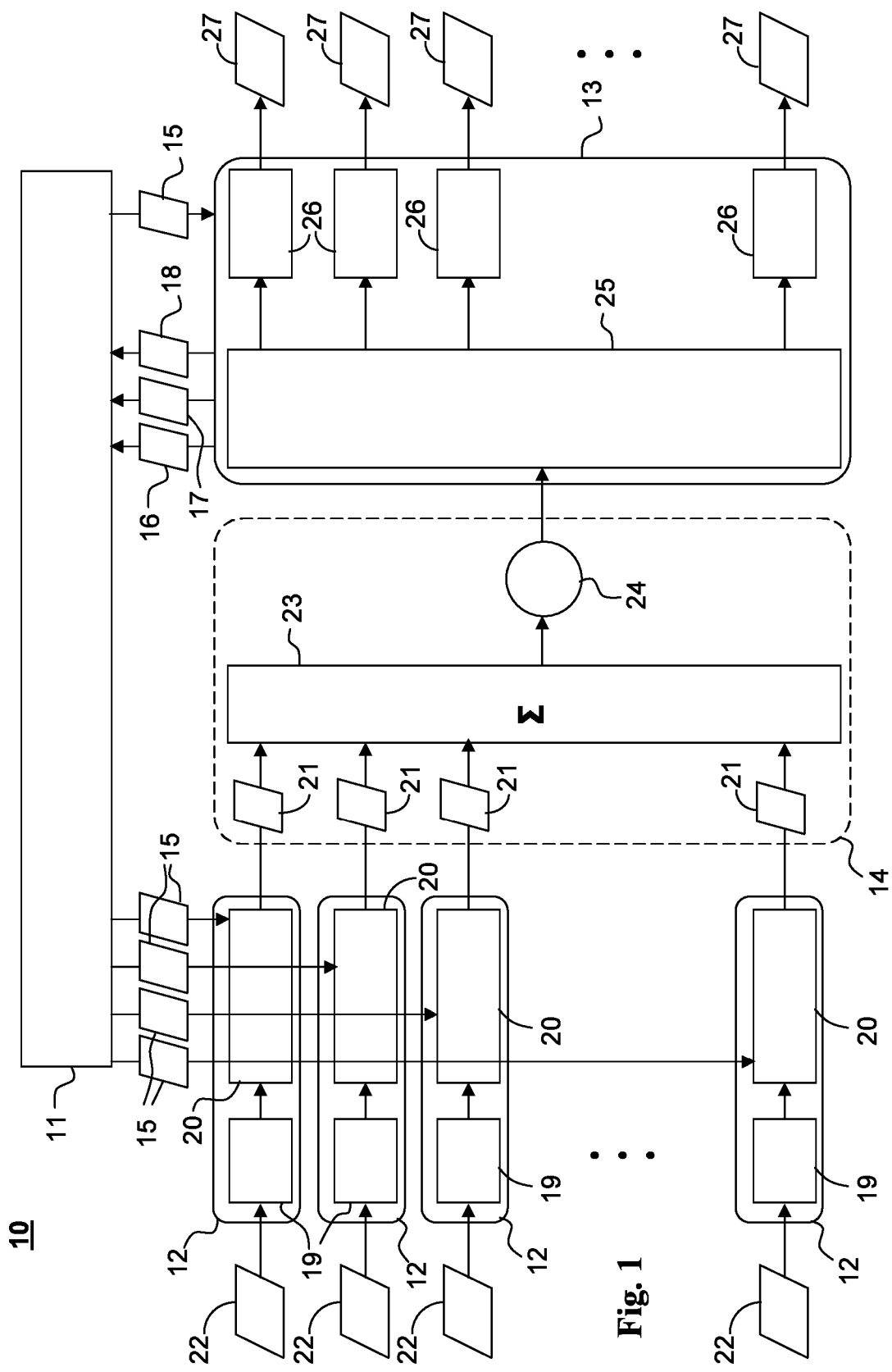
FIG. 1 is a block diagram of a generalized JCMA system incorporating a Max-I constellation calculator.

The principles and operation of a positioning system and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

Reference is now made to FIG. 1, which is a view of a simplified block diagram of a generalized communication system 10 incorporating a Max-I constellation calculator 11 according to an embodiment of the present invention.

FIG. 1 preferably demonstrates a method for calculating a constellation for a modulation scheme for use by the communication system 10 where the method comprises the step of using the maximum sum-rate mutual information criterion.

As seen in FIG. 1, the communication system 10 preferably includes a plurality of transmitters 12 communicating with a receiver 13 via a communication medium 14 and the Max-I constellation calculator 11. The Max-I constellation calculator 11 provides the communication system 10 with an optimized symbol constellation 15. The optimization is preferably based on the maximal sum-rate mutual information criterion (Max-I) according to the number of transmitters N (element 16), and/or the signal-to-noise ratio (SNR) (element 17), and/or the modulation scheme used (element 18). Modulation schemes may be BPSK, QPSK, QAM, or any other symbol coding method.

As seen in FIG. 1, each transmitter 12 preferably includes a coder 19, such as a BCH coder or any other error correcting coder, and a modulator 20 preferably producing a constellation 21, or a constellation component 21 according to the optimized constellation 15, and according to data 22 as coded by the coder 19.

Preferably, the communication system 10 is a joint constellation multiple access (JCMA) communication system and the communication method used by the communication system 10 is a joint constellation multiple access (JCMA) communication method. In the case of the JCMA communication system and method the constellation signals 21 are components of a JCMA constellation 23. Hence, for JCMA, the constellation components 21 are joined in the communication medium to form the JCMA constellation 23. In the case of the JCMA communication system and method the JCMA constellation 23 is preferably compatible with the Max-I optimized constellation 15.

As seen in FIG. 1, the communication medium 14 adds noise, such as additive white Gaussian noise (AWGN) 24 to the signal transmitted by the transmitters 11 and received by the receiver 13.

As seen in FIG. 1, the receiver 13 preferably includes a signal demodulator 25 and decoders 26, together demodulating and decoding the received signal and producing data channels 27 corresponding to data 22.

Throughout this document the term receiver, such as receiver 13, usually refer to a wireless concentrator station such as a cellular base-station, a WiFi access point, a satellite, and/or a satellite ground station, etc., and/or a concentrator in a wired network such as a hub, a head-end, etc. It is appreciated that such receiver, such as receiver 13, is also capable of transmitting.

Throughout this document the term transmitter, such as transmitter 12, usually refer to a wireless station such as a cellular mobile station, a WiMAX user station, a WiFi unit, a satellite, and/or a satellite ground station, etc., and/or a node in a wired network such as a terminal node. It is appreciated that such transmitter, such as transmitter 12, is also capable of receiving To calculate the Max-I optimized constellation 15 the Max-I constellation calculator 11 uses the maximum sum-rate mutual information criterion. The maximum sum-rate mutual information is calculated by the Max-I constellation calculator 11 according to Eq. 1:

$$I(X;Y) = \int_{x \in X} \int_{y \in Y} p(x, y) \log_2 \frac{p(x, y)}{p(x)p(y)} dx dy,$$ Eq. 1 where:
X is a transmitter transmitting at least a part of said JCMA constellation and Y is a receiver receiving said JCMA constellation;
I(X, Y) is said mutual information function; and
p(x, y) is the joint probability density function for X and Y, and p(·) is the marginal probability density functions for X and Y respectively.

It is appreciated that the constellation calculated using the maximum sum-rate mutual information criterion as described above provides at least one of: optimal spectral efficiency, optimal bit-rate, and optimal transmission power.

Figure 2:
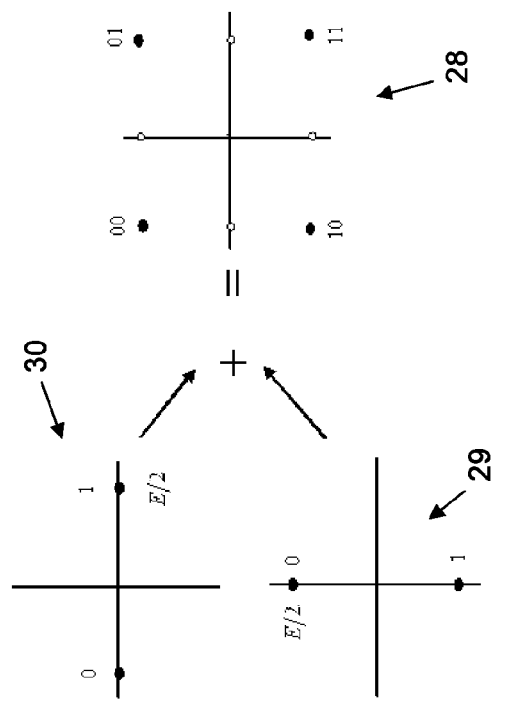
FIG. 2 is a simplified graphical description of a synchronized superimposed constellation.

Reference is now made to FIG. 2, which is a simplified graphical description of a synchronized superimposed constellation 28, according to a preferred embodiment of the present invention.

As seen in FIG. 2, the scenario assumes that the number of transmitters 11 is N=2 and that transmitters 11 are using Binary Phase Shift Keying (BPSK) (element 29 and 30). Each transmitter 11 uses a power of P watts and a sub-band of W/2 Hz. The corresponding symbol duration is T. The BER for this scenario is given by Eq. 2:

$$P_b = Q(\sqrt{2SNR}),$$ Eq. 2 where $SNR \stackrel{def}{=} E/N_0$ and $E = P \cdot T$.

When using SM the two transmitters use the whole bandwidth W, which allows doubling of the symbol rate. The symbol duration is now T/2. The two transmitters use BPSK at double the rate, but with an energy per bit of E/2. A superimposed constellation 28 is constructed at the receiver comprising four constellation points in a Quadrature Phase Shift Keying (QPSK) like setting. If the transmitters are not symbol-synchronized the superimposed constellation would be sub-optimal for decoding. However when the transmitters are synchronized so that each transmitter occupies a single carrier component (quadrature or in-phase) the resulting constellation is always robust for decoding.

Since the transmitters occupy orthogonal dimensions and the SNR per bit is now SNR/2 uncoded BER is given by Eq. 3:

$$P'_b = Q(\sqrt{SNR})$$ Eq. 3

Noting that $P'_b > P_b$. $P'_b$ is preferably reduced by applying a practical coding scheme.

To have a throughput higher than that without synchronized SM we limit the coding rate to be higher or equal to 0.5.

For this illustrative scenario we use a simple BCH code (n, k, d)=(127, 64, 10) with hard decoding resulting in a code rate of 0.504. For perfect codes the coded BER is according to Eq. 4:

$$P'_c = 1 - \left[ \sum_{l=1}^{0.5d-1} \binom{n}{l} P'^l_b (1 - P'_b)^{n-l} \right]^{1/k}$$ Eq. 4

In this case Eq. 4 is an upper bound on the coded BER.

Figure 3:
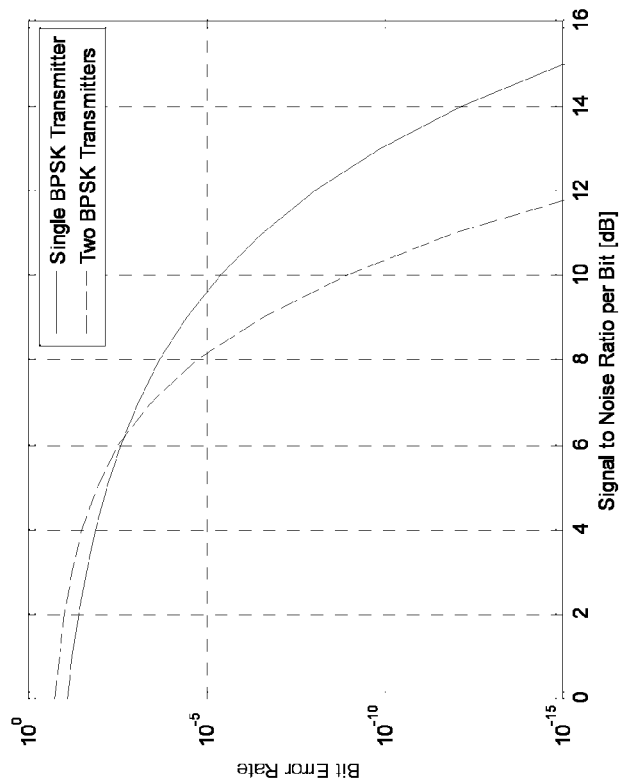
FIG. 3 is a simplified graphical representation of a BER to SNR dependency for the scenario of FIG. 2.

Reference is now made to FIG. 3, which is a simplified graphical representation of a BER to SNR dependency for the scenario of FIG. 2, according to a preferred embodiment of the present invention.

FIG. 3 depicts BER of classical FDMA and the upper bound on BER with synchronized SM and the BCH code. As shown, SNR gains of at least 2 dB for SNR higher than 8 dB. The SNR gain can be translated to reduction of power emissions, increased throughput and increased cell size.

Figure 4:
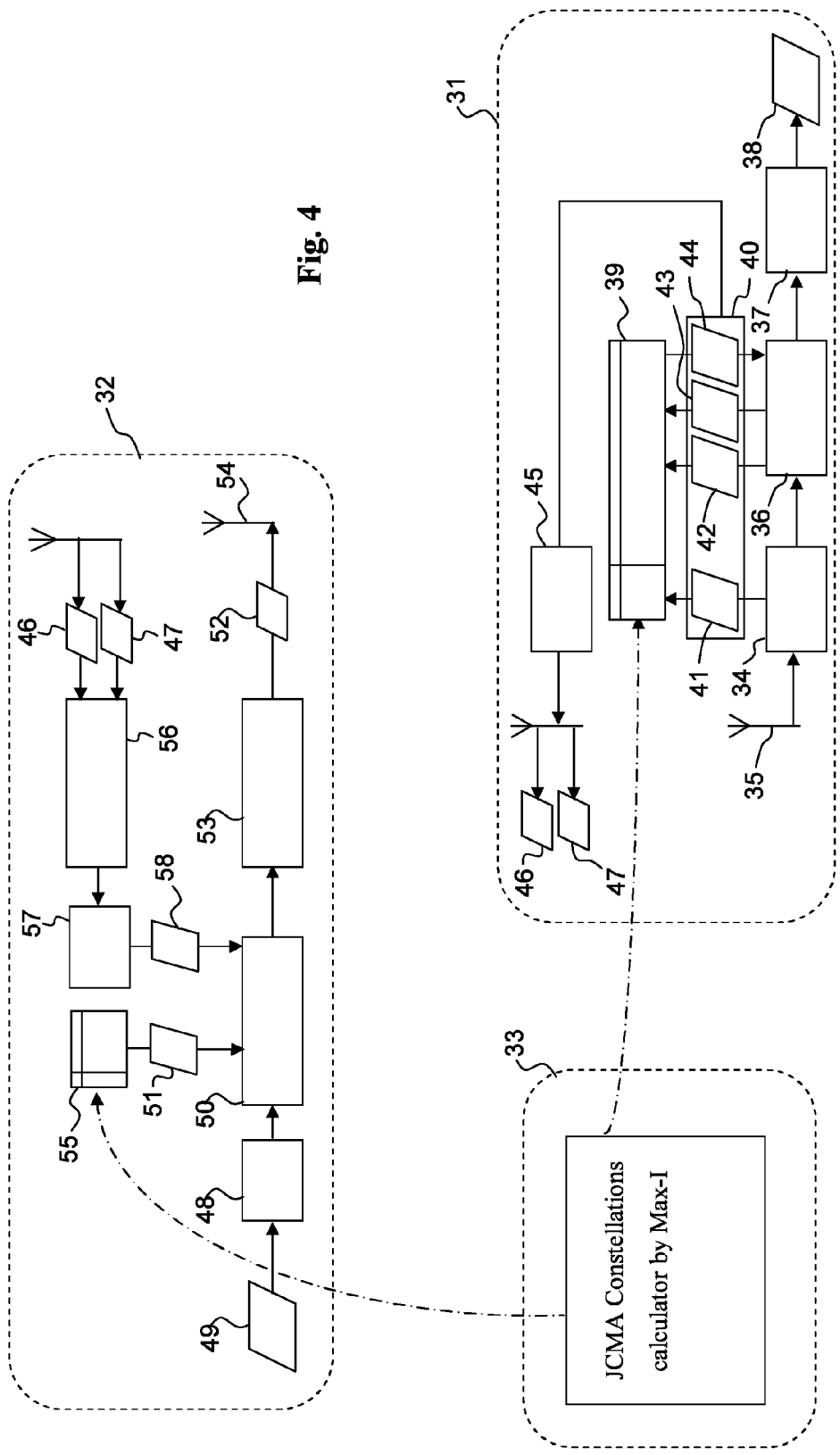
FIG. 4 is a simplified block diagram of a JCMA receiver, a JCMA transmitter, and a Max-I JCMA constellation calculator.

Reference is now made to FIG. 4, which is a simplified block diagram of a JCMA receiver 31, a JCMA transmitter 32 and a Max-I JCMA constellation calculator 33, according to a preferred embodiment of the present invention.

It is appreciated that:
the JCMA receiver 31 is equivalent to the receiver 12 of FIG. 1 adapted for JCMA communication method and system;
the JCMA transmitter 32 is equivalent to the transmitter 13 of FIG. 1 adapted for JCMA communication method and system; and
the Max-I JCMA constellation calculator 33 is equivalent to a Max-I constellation calculator 11 of FIG. 1 adapted for JCMA communication method and system.

As seen in FIG. 4, the Max-I JCMA constellation calculator 33 is preferably separated from both the receiver 31 and the transmitter 32, preferably calculating optimal JCMA constellations in offline mode, and preferably providing the Max-I calculated JCMA constellations as a look-up table (LUT) to receivers 31 and transmitters 32.

It is appreciated that alternatively the Max-I JCMA constellation calculator 33 can be incorporated, preferably in the receivers 31.

Preferably, the LUT contains a plurality of JCMA constellation where each JCMA constellation contains a plurality of JCMA constellation component types. Each JCMA constellation component type is preferably allocated, preferably by the receiver 31, to a particular transmitter 32. The JCMA constellation component type is the group of constellation points that are allocated to a particular transmitter 32. Preferably, the JCMA constellation component type reflects the modulation scheme used by the particular transmitter 32.

It is appreciated that the JCMA constellations calculated by the Max-I JCMA constellation calculator 33 and provided in the LUT enables a JCMA communication system including one or more receivers 31 and transmitters 32 to reach optimal spectral efficiency, and/or optimal bit-rate, and/or optimal transmission power.

As seen in FIG. 4, the receiver 31 preferably includes the following components:
A receiver module 34 receiving JCMA constellations (JCMA signals or JCMA symbols) via antenna 35. The receiver 34 is connected to a JCMA demodulator 36, which is connected to a decoder 37 (such as a BCH decoder) outputting a data channel 38.
A storage module 39, such as a Flash memory module, storing a look-up table (LUT) of Max-I optimized JCMA constellations preferably calculated by the Max-I JCMA constellation calculator 33.
A Max-I JCMA constellation selector 40 using measured SNR value 41, number of transmitters N (42) in a JCMA group, and the modulation schemes 43 (such as BPSK, QPSK, QAM, etc.) assigned to the transmitters in the JCMA group to select and retrieve an appropriate Max-I JCMA constellation 44 from the LUT in memory module 39.
A transmitter module 45 for transmitting a message 46 containing the selected and/or a pilot signal 47 to the transmitters 32.

It is appreciated that in alternative configuration where the Max-I JCMA constellation calculator 33 is incorporated in the receivers 31 the Max-I JCMA constellation calculator 33 is preferably incorporate in the Max-I JCMA constellation selector, or the Max-I JCMA constellation selector is the Max-I JCMA constellation calculator 33.

As seen if FIG. 4, the transmitter 32 includes the following components:
A coder 48 (such as a BCH coder or other) receiving the data 49 for transmission. The coder 48 provides the coded data to a JCMA modulator 50. The JCMA modulator 50 uses a modulation scheme (such as BPSK, QPSK, QAM, etc.) and a JCMA constellation 51 to produce a JCMA constellation component 52. The JCMA constellation component is transmitted via transmitter module 53 and antenna 54 to the receiver 31.
A storage module 55, such as a Flash memory module, storing a look-up table (LUT) of Max-I optimized JCMA constellations preferably calculated by the Max-I JCMA constellation calculator 33.
A receiver module 56 receiving the message 46 containing the selected constellation (or an identification of the selected constellation), and/or the pilot signal 47.
A power and phase correction calculator 57 providing power and phase correction data 58 to the modulator 50.

Preferably, the transmitter 32 receives from the receiver 31 the message 46 containing identification of the JCMA constellation selected by the receiver 31. The transmitter 32 then retrieves the selected JCMA constellation 51 from the LUT in the storage module 55. The selected JCMA constellation 51 includes identification of the JCMA constellation and the JCMA constellation component type allocated to the particular transmitter. Using the JCMA constellation 51 the modulator 50 creates the JCMA constellation component 52.

Preferably, the transmitter 32 receives from the receiver 31 a sequence of pilot signals 47. Using the pilot signals 47 the power and phase correction calculator 57 calculates the power and phase correction data 58. Using the power and phase correction data 58 the modulator modifies the power and the phase of the JCMA constellation component 52 to provide an optimal joint constellation at the receiver 31.

In the mode of operation described in FIG. 4 the Max-I calculated JCMA constellations are calculated offline and are provided as a look-up table (LUT) to receivers 31 and transmitters 32. The receiver 31 preferably sends a message (not shown) to a group of transmitters 32 selected to participate in a particular JCMA group. The message indicates a particular JCMA constellation selected from the LUT. The JCMA constellation is preferably selected per the number N of transmitters 32 in the JCMA group, and/or the SNR measured by the receiver 31 for this group of transmitters 32, and/or modulation schemes assigned to each of the transmitters 32 of this group.

Figure 5:
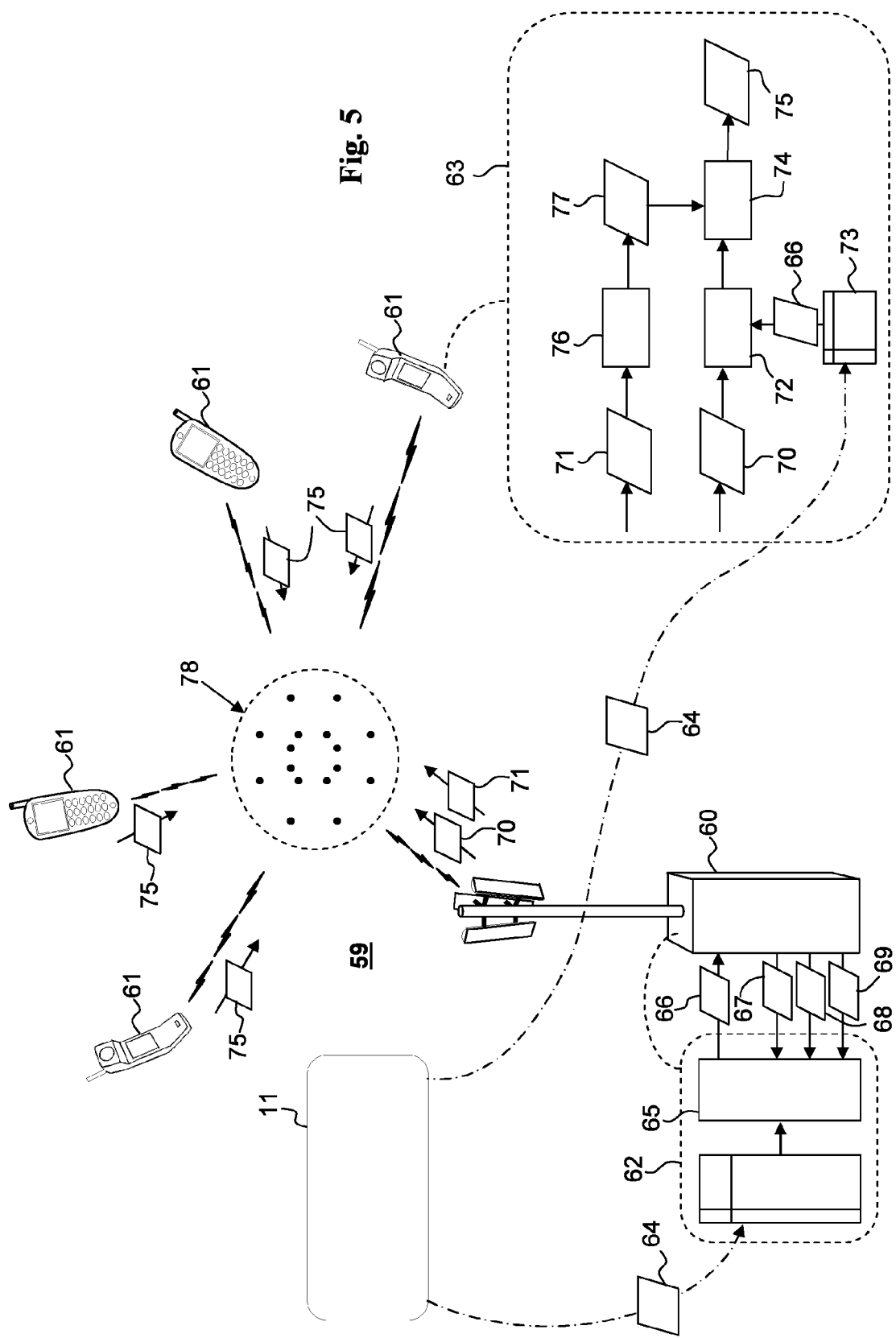
FIG. 5 is a simplified illustration of a JCMA-based cellular communication system incorporating a Max-I constellation calculator.

Reference is now made to FIG. 5, which is a simplified illustration of a JCMA-based cellular communication system 59 incorporating a Max-I constellation calculator 11 according to a preferred embodiment of the present invention.

As seen in FIG. 5, the JCMA-based cellular communication system 59 preferably includes a cellular base-station 60, a plurality of cellular mobile stations (e.g. mobile telephones) 61, and an offline JCMA Constellations calculator by Max-I 11.

It is appreciated that alternatively the JCMA Constellations calculator by Max-I 11 may be incorporated in the cellular base-station 60. It is also appreciated that the cellular base-station 60 is preferably equivalent to the receiver 13 of FIG. 1 or to receiver 31 of FIG. 4. Cellular base-station 60 may therefore also represent a WiFi access point or any other communication concentrator. It is further appreciated that the cellular mobile stations 61 are preferably equivalent to the transmitters 12 of FIG. 1 or to transmitter 32 of FIG. 4. Cellular mobile stations 61 may therefore also represent WiFi terminals or any other type of communication nodes.

Element 62 of FIG. 5 is a block diagram of a part of the base-station 60, and element 63 is a block diagram of a part of the mobile stations 61.

As seen in FIG. 5, the JCMA Constellations calculator 11 preferably generates a look-up table (LUT) 64 of JCMA constellation using maximal sum-rate mutual information criterion. The LUT 64 is then distributed and/or loaded to base-stations 60 and mobile stations 61.

Preferably, the LUT contains a plurality of JCMA constellation where each JCMA constellation contains a plurality of JCMA constellation component types. The JCMA constellation component type is the group of constellation points to be allocated to a particular transmitter of the JCMA transmitters group forming the JCMA constellation. Preferably, the JCMA constellation component type reflects the modulation scheme used by the particular transmitter.

A constellation selector 65 in the base-station 60 selects a JCMA constellation 66 for the LUT according to SNR 67, number N 68 of mobile stations 61 and type of modulation scheme 69 (e.g. BPSK, QPSK, QAM, etc.). The base-station 60 sends a message 70 to each of the mobile stations 61 informing them of the selected JCMA constellation 66 and the particular JCMA constellation component type (group of constellation points) allocated to the particular mobile stations 61.

The base-station 60 then preferably transmits pilot signals 71. Preferably, the power level of the pilot signal is adjusted according to the number of transmitters.

Upon accepting the message 70 A constellation selector 72 at the mobile station 61 retrieves the appropriate JCMA constellation 66 from the LUT 64 stored in the storage module 73. In this respect the JCMA constellation 66 includes the particular JCMA constellation component type (group of constellation points) allocated to the mobile stations 61. Using the JCMA constellation 66 a modulator 74 generates a component 75 of the JCMA constellation 66.

According to the pilot signal 71, power and phase correction module 76 calculates power P and constellation rotation angle θ. Using these power P and phase θ correction values 77 the modulator 74 transmits JCMA constellation components 75 to the receiver. Thus the JCMA constellation 78 is created from the combination of the JCMA constellation components 75 of the transmitters 61.

Figure 6:
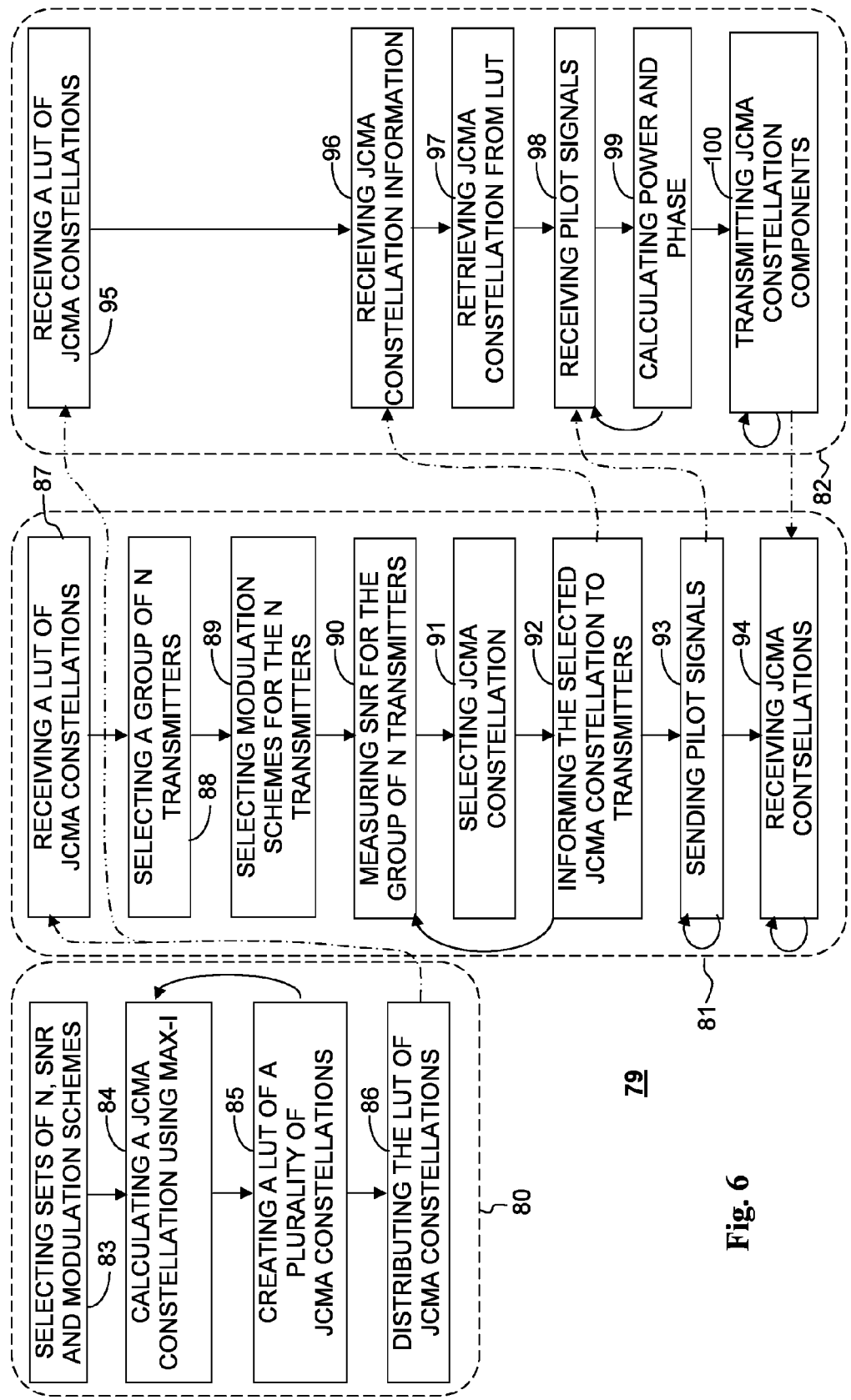
FIG. 6 is a simplified block diagram of a process executed by the JCMA-based cellular communication system of FIG. 5.

Reference is now made to FIG. 6, which is a simplified flow chart of a process 79 executed by the JCMA-based cellular communication system 59 of FIG. 5, according to a preferred embodiment of the present invention.

It is appreciated that the process 79 or a similar process can also be executed by the system described in accordance with FIG. 1 and/or FIG. 4.

As seen in FIG. 6, the process 79 preferably includes a LUT generation process 80, a receiver process 81, and a transmitter process 82. The LUT generation process 80 is preferably executed by the Max-I constellation calculator 11 of FIG. 5. The receiver process 81 is preferably executed by the base station 60 of FIG. 5. The transmitter process 82 is preferably executed by the mobile station 61 of FIG. 5.

As seen in FIG. 6, the LUT generation process 80 preferably starts with step 83 by selecting or preparing the following sets:

A set of values of signal-to-noise ratio (SNR) (e.g. 5 dB, 10 dB, 15 dB, . . . ).

A set of values (e.g. 2, 3, 4, . . . ) of the number of transmitters participating in a joint constellation multiple access (JCMA) transmitters group to form a JCMA constellation. Such as transmitters 12 of FIG. 1, or mobile stations 61 of FIG. 5.

A set of modulation schemes such as BPSK, QPSK and various QAM schemes.

The LUT generation process 80 preferably continues with step 84 by selecting at one value from at least two sets of the sets created in step 83, namely an SNR value, a value for N=number of transmitters participating in a JCMA transmitters group, and one or more modulation schemes. The LUT generation process 80 then generates a JCMA constellation according the maximal sum-rate mutual information criterion. That is, a JCMA constellation for which the sum of mutual information value is maximal. Preferably, each of the JCMA constellations includes a plurality of JCMA constellation component types according to the number of transmitters in the JCMA group and the modulation schemes allocated to these transmitters.

The LUT generation process 80 preferably continues with step 85 to create a loop-up table (LUT) of JCMA constellations by repeating step 84 for a plurality of combinations of values of the sets of step 83.

The LUT generation process 80 preferably continues with step 86 to distribute the LUT created in step 85 to receiver and transmitters such as base station 60 and mobile stations 61 of FIG. 5. The LUT may be distributed using any type of non-transitory computer readable media.

The receiver process 81 preferably starts with step 87 preferably by receiving the LUT from the LUT generation process 80. Receiver process 81 then preferably continues with step 88 preferably by selecting a group of transmitters to participate in a JCMA constellation (a.k.a JCMA group or JCMA transmitter group). Receiver process 81 then preferably continues with step 89 preferably by selecting the modulation mechanisms for the transmitters in the JCMA group. Receiver process 81 then preferably continues with step 90 preferably by measuring SNR value for signals transmitted by the JCMA transmitter group.

Receiver process 81 then preferably continues with step 91 preferably by selecting from the LUT received in step 87 a JCMA constellation that fits the values of N, SNR and modulation schemes as selected in steps 88, 90 and 89. Receiver process 81 then preferably continues with step 92 preferably by informing the transmitters of the JCMA group of the selected JCMA constellation and their respective constellation component type.

It is appreciated that alternatively, step 91 may include calculating a JCMA constellation using Max-I such as in step 84 using the values of N, SNR and modulation schemes as selected in steps 88, 90 and 89.

Optionally but preferably the receiver process 81 continues with step 93 preferably by sending a pilot signal. Preferably, the transmission power level of the pilot signal is calculated according to a number of transmitters in said group of transmitters. Step 93 is preferably repeated, preferably indefinitely.

Receiver process 81 then preferably continues with step 94 preferably by receiving JCMA constellations transmitted by the JCMA transmitter group and preferably demodulating and decoding the JCMA constellations to form a data channel per each of the transmitters. Step 94 is preferably repeated, preferably indefinitely.

Preferably, steps 90, 91 and 92 are preferably repeated, preferably indefinitely.

The transmitter process 82 preferably starts with step 95, preferably by receiving the LUT from the LUT generation process 80. Transmitter process 82 then preferably continues with step 96 preferably by receiving the identification of the selected JCMA constellation as sent by the receiver in step 92. Transmitter process 82 then preferably continues with step 97 preferably by retrieving the selected JCMA constellation and the allocated constellation component type from the LUT received in step 95.

Optionally but preferably the transmitter process 82 continues with step 98 preferably by receiving the pilot signal transmitted by the receiver in step 93. Transmitter process 82 preferably continues with step 99 preferably by calculating transmission power P and/or constellation rotation angle θ (a.k.a phase rotation, phase correction) according to the received pilot signal. Steps 98-99 are preferably repeated, preferably indefinitely.

Transmitter process 82 preferably continues with step 100 preferably by transmitting a JCMA constellation component using the selected JCMA constellation and/or JCMA constellation component type according to the LUT and the JCMA selection information received from the receiver in step 97. Preferably the power and phase values of the JCMA constellation component are corrected by the values obtained in step 99. Step 100 preferably repeats, preferably indefinitely.

It is appreciated that the transmitters may use the same modulation schemes or various mixes of modulation schemes.

Figure 7:
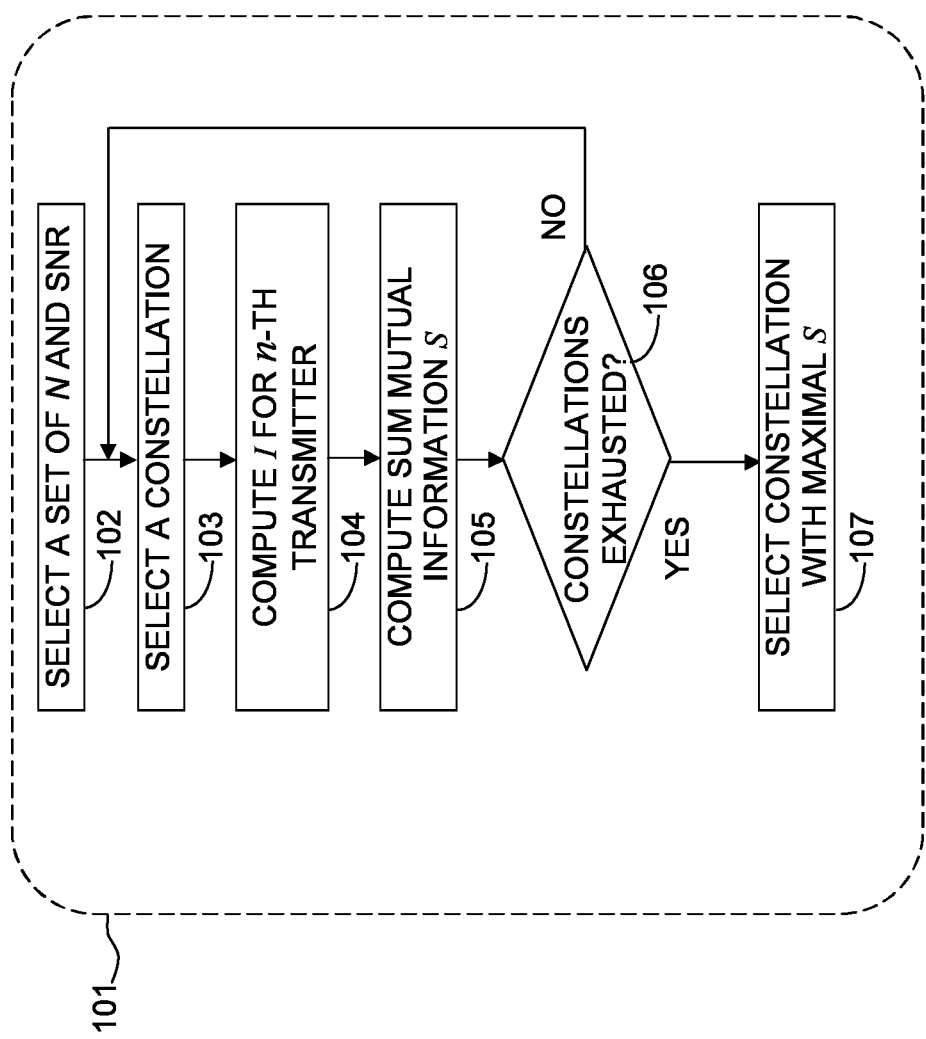
FIG. 7 is a simplified flow chart of a process for calculating a JCMA constellation using Max-I.

Reference is now made to FIG. 7, which is a simplified flow chart of a process 101 for calculating a JCMA constellation using Max-I, as preferably executed by step 84 of FIG. 6, according to a preferred embodiment of the present invention.

As seen in FIG. 7, the process 101 for calculating a JCMA constellation using Max-I starts with step 102 preferably by selecting a number of transmitters and an SNR value from the sets prepared in step 83 of the of FIG. 6.

Process 101 preferably continues with step 103 by selecting a constellation component type for each of the transmitters N.

Process 101 preferably continues with step 104 to compute the mutual information function I for the values selected in step 102 and according to the constellation components selected in step 103. The mutual information between n-th transmitter and the receiver is given by Eq. 5:

$$I_n(\underline{x}^{(n)}) = \sum_{i=1}^{M} \int_{-\infty}^{\infty} p(y/x_i^{(n)}) P(x_i^{(n)}) \log_2 \frac{p(y/x_i^{(n)})}{p(y)} \, dy, \quad \text{Eq. 5}$$

where the vector $\underline{x}^{(n)} = [x_1^{(n)}, x_2^{(n)}, \ldots, x_M^{(n)}]$, n=1, 2, ..., N represent the possible M outcomes (constellation points) of the n-th transmitter, where M is the number of possible symbols for the selected modulation scheme (e.g. 2 for BPSK, 4 for QPSK, etc.);

$P(x_i^{(n)})$ is the probability distribution of the possible outcomes of the n-th transmitter;

$p(y/x_i^{(n)})$ is the conditional probability density function of the channel outcome given $x_i^{(n)}$. For Gaussian channel noise $p(y/x_i^{(n)})$ is represented by Eq. 6

$$p(y/x_i^{(n)}) = \frac{1}{\sqrt{2\pi\sigma^2}} \exp\left\{-\frac{(y - x_i^{(n)})^2}{2\sigma^2}\right\}, \quad \text{Eq. 6}$$

where $\sigma^2$ is reciprocal of the SNR.

Process 101 preferably continues with step 105 to compute the sum-rate mutual information, defined by Eq. 7:

$$S[\underline{x}^{(1)}, \underline{x}^{(2)}, \ldots, \underline{x}^{(N)}] = \sum_{n=1}^{N} I_n(\underline{x}^{(n)}) \quad \text{Eq. 7}$$

Process 101 preferably repeats steps 104-105 for different sets of vectors $\underline{x}^{(1)}, \underline{x}^{(2)}, \ldots, \underline{x}^{(N)}$, and when the sets of vectors are exhausted (step 106) Process 101 preferably continues to step 107.

In step 107 process 101 (the Max-I calculator) looks for set of vectors $\underline{x}^{(1)}, \underline{x}^{(2)}, \ldots, \underline{x}^{(N)}$ such that $S[\underline{x}^{(1)}, \underline{x}^{(2)}, \ldots, \underline{x}^{(N)}] \rightarrow$ max under constraint represented by Eq. 8:

$$\sum_{i=1}^{M} |x_i^{(n)}|^2 = 1, n = 1, 2, \ldots, N \quad \text{Eq. 8}$$

thus selecting for the LUT the constellation for which S is maximal.

Or, in more compact notation, as depicted by Eqs. 9:

$$[\underline{x}_{opt}^{(1)}, \underline{x}_{opt}^{(2)}, \ldots, \underline{x}_{opt}^{(N)}] = \arg\left\{\max_{\{\underline{x}^{(1)}, \underline{x}^{(2)}, \ldots, \underline{x}^{(N)}\}} [S[\underline{x}^{(1)}, \underline{x}^{(2)}, \ldots, \underline{x}^{(N)}]]\right\} \quad \text{Eq. 9}$$

under constraint as depicted by Eq. 10:

$$\sum_{i=1}^{M} |x_i^{(n)}|^2 = 1, n = 1, 2, \ldots, N \quad \text{Eq. 10}$$

The vectors $\underline{x}_{opt}^{(1)}, \underline{x}_{opt}^{(2)}, \ldots \underline{x}_{opt}^{(N)}$ constitute the nominal constellation of the transmitter 1, 2, ..., N respectively. The number of points of the joint constellation equals to $M^N$.

Reference is now made to FIGS. 8a, 8b, 8c, and 8d, which are simplified illustrations of optimal superimposed (JCMA) constellations for N=3, BPSK and SNR values of 5 dB, 10 dB, 12 dB, and 15 dB, respectively, according to a preferred embodiment of the present invention.

The optimization of the superimposed constellation for N users (mobile stations) is calculated using the maximum sum-rate mutual information criterion as follows:

Let $P=[P_1, P_2, \ldots, P_N]$, $\theta=[\theta_1, \theta_2, \ldots, \theta_N]$, where $(P_n, \theta_n)$ are the average power and right rotation (in degrees) of constellation of user n. Using x=[−1,1] for BPSK and x=[−1,1, j,−j] for QPSK, the transmitted constellations can be written by Eq. 11:

$$x_n = x\sqrt{P_n} \, e^{j\theta_n \frac{\pi}{180°}} \quad \text{Eq. 11}$$

The design criterion is maximizing the sum-rate mutual information and is defined by Eq. 12:

$$[P,\theta] = \arg\max_{P_n \in [0,1], \theta_n \in [0,180°], n=1,2,\ldots,N} I(X_1, X_2, \ldots, X_N; Y) \quad \text{Eq. 12}$$

Thus, FIGS. 8a, 8b, 8c, and 8d depict superimposed constellations for x=[−1,1], for three mobile stations (N=3) and for SNR values of 5 dB, 10 dB, 12 dB, and 15 dB, respectively.

Table 1 shows the minimum distance $d_{min}$ and the next smallest distance $d_{min,2}$ for three users and x=[−1,1]. Table II shows the magnitude and relative rotations of the constellations of transmitters 2 and 3 for three users and x=[−1,1]. The power of transmitter 1 is set it 1 and his rotation is reference rotation and is set to 0. As can be seen from table II, for SNRs greater than 5 dB, the relative phases are fixed and the minimum distances are determined only by varying the power of the second user whose angle of rotation is between those of the two other users. In fact, this shows that increasing the minimum distance is achieved by decreasing the power.

TABLE 1

$d_{min}$ and $d_{min,2}$ for SNR 2, 5, 10, 12, 15 dB.

| SNR [dB] | $d_{min}$ Value | # | $d_{min,2}$ value | # |
|---|---|---|---|---|
| 2 | 0.0000 | 1 | 2.0000 | 18 |
| 5 | 0.9701 | 1 | 1.4994 | 4 |
| 10 | 1.3036 | 1 | 1.4183 | 4 |
| 12 | 1.3474 | 1 | 1.4159 | 4 |
| 15 | 1.3787 | 1 | 1.3985 | 2 |

Note that for any distance the right-hand column indicates how many pairs are characterized by that distance.

TABLE 2

Magnitude and Relative Rotation of the Constellation of Transmitters 2 and 3

| | $d_{min}$ | | $d_{min,2}$ | |
|---|---|---|---|---|
| SNR [dB] | $\theta_2$ [deg] | $P_2$ | $\theta_2$ [deg] | $P_2$ |
| 2 | 60 | 1 | 120 | 1 |
| 5 | 44.8 | 0.9656 | 89.6 | 1 |
| 10 | 45 | 0.7627 | 90 | 1 |
| 12 | 45 | 0.7404 | 90 | 1 |
| 15 | 45 | 0.7267 | 90 | 1 |

Based on the optimization results we make the following observations:

Recall that the sum-rate is always the dominant rate constraint (it is never loose).

In order to take advantage of the maximum available rate the mobile units need to coordinate both power and rotation as seen in Table 2

It is noted that the optimal superimposed constellation for high SNR does not use the maximum power available at all transmitters as seen in Table 2. In fact by backing off the power of one user it is possible to obtain higher sum-rate. This means that one user is "sacrificing" its performance and its maximum achievable rate is less than its individual constraint. For example, if the user with reduced power is user 2 then $$I(X_2; Y | X_1, X_3) < \max_{P_3 \in [0,1]} I(X_2; Y | X_1, X_3)$$

Figure 8B:
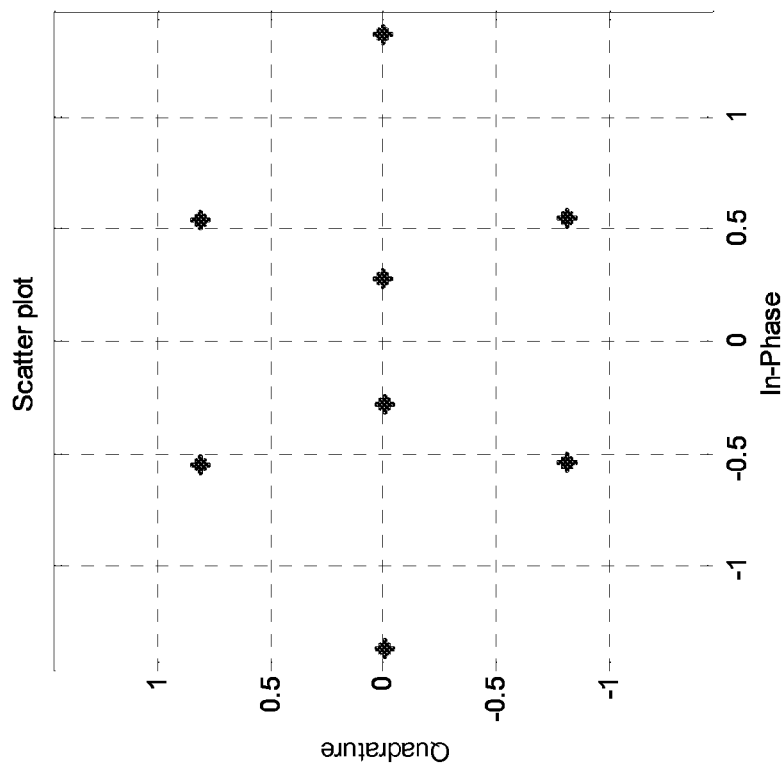
FIGS. 8a, 8b, 8c, and 8d, which are simplified illustrations of optimal superimposed (JCMA) constellations for N=3, BPSK and SNR values of 5 dB, 10 dB, 12 dB, and 15 dB, respectively.
Figure 8A:
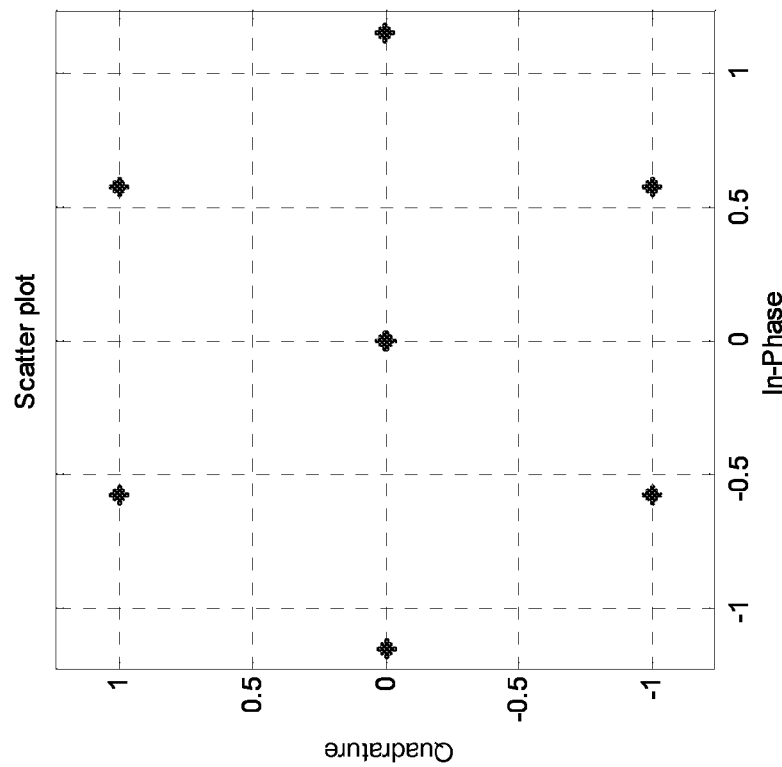
Figure 8D:
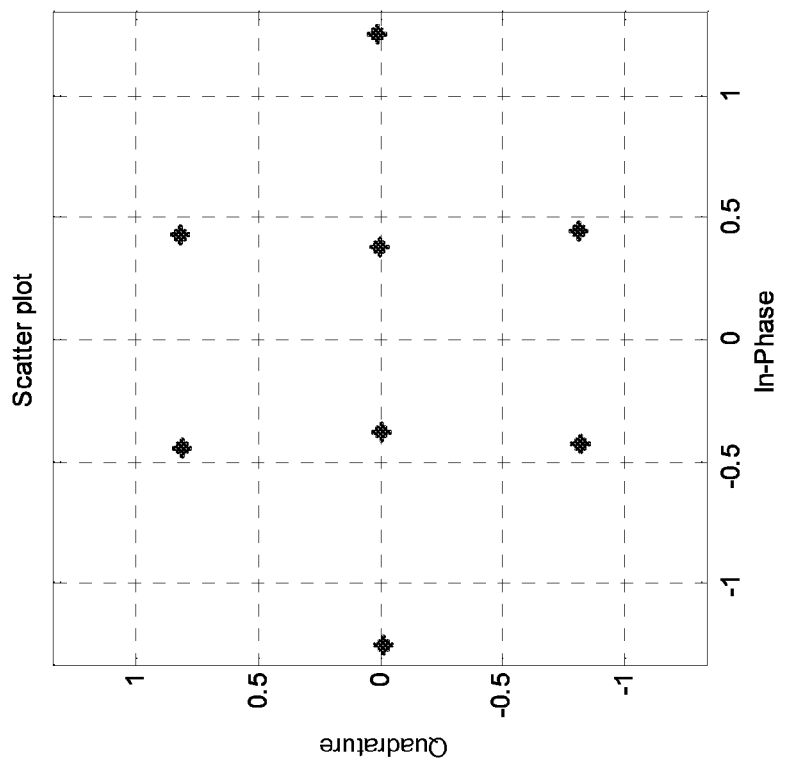
Figure 8C:
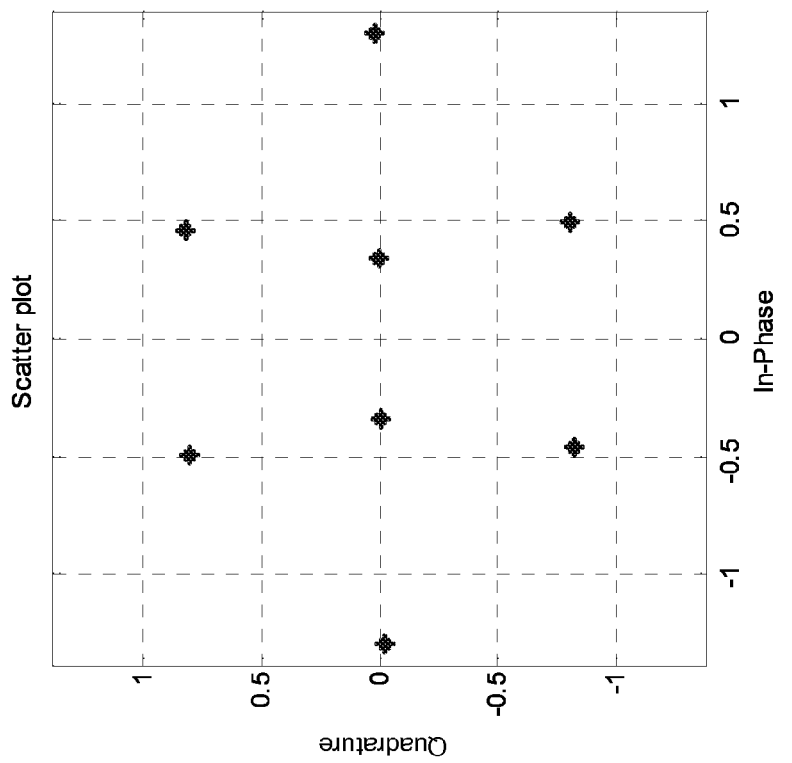

It can be seen from FIGS. 8c, 8b, 8c, and 8d, that as the SNR increases, the distance between the inner points increases as well. This brings the inner points closer to the outer points therefore reducing $d_{min,2}$ and increasing $d_{min}$.

It is noted that the superimposed constellations at high SNR coincides with the superimposed constellation, obtained by maximizing $d_{min}$ rather than sum-rate mutual-information.

At low SNR, all users make the best effort in the sense that they transmit with the maximum available power. From FIGS. 8a, 8b, 8c, and 8d, it is seen that when the SNR is 2 dB the constellations are spread at equal angular distances of 60 degrees. The superimposed constellation points form a lattice and for one pair $d_{min}$ is zero, however, $d_{min,2}$ is maximized (see also Table I). As the SNR increases the minimum distance increases. At the same time, the next smallest distance $d_{min,2}$ decreases. The explanation lies in the dominating error event: at high SNR the error event is dominated by the closest pair of constellation points. Hence for high SNR we aim at maximizing the minimum distance. For low SNR, error events between constellation points which are more than $d_{min}$ apart become a dominant factor. Therefore, the optimal constellation has a zero $d_{min}$ but the largest $d_{min,2}$. This decreases the probability of error for constellation points except the nearest pair. Since only a single pair is located at a distance $d_{min}$ and many other pairs are located at a distance $d_{min,2}$ apart, the overall probability of error is decreased.

This process also optimizes phase and power. This optimization obtains $d_{min}$=1.1321 at SNR=10 dB (cf. 1.3036 when optimizing over power as well) and $d_{min}$=0.8723 at SNR=5 dB (cf. 0.9071 obtained when optimizing over power as well). Comparing the maximum achievable sum-rate spectral efficiencies obtained when optimizing only the phase to those obtained when optimizing both phase and power, it is possible to conclude that the increase in the achievable rate associated with the increased minimum distances is only of the order of 0.5%. It follows that the main advantage in optimizing over power is the ability to achieve the same rate while using less transmission power, hence extending the lifetime of the mobile stations without sacrificing rate.

Figure 9B:
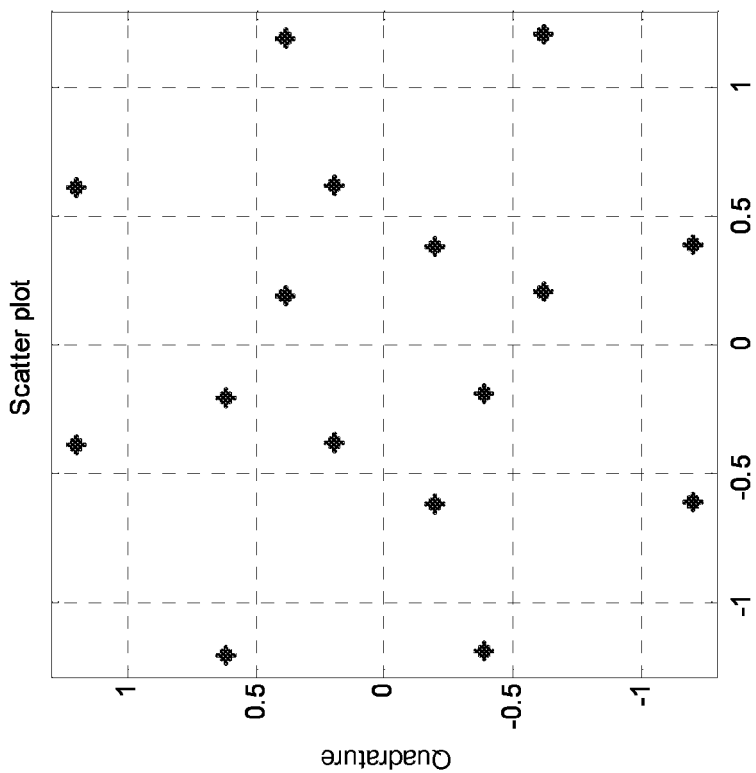
FIGS. 9a, 9b, and 9c, which are simplified illustrations of optimal superimposed (JCMA) constellations for N=4, BPSK and SNR values of 10 dB, 12 dB, and 15 dB, respectively.
Figure 9A:
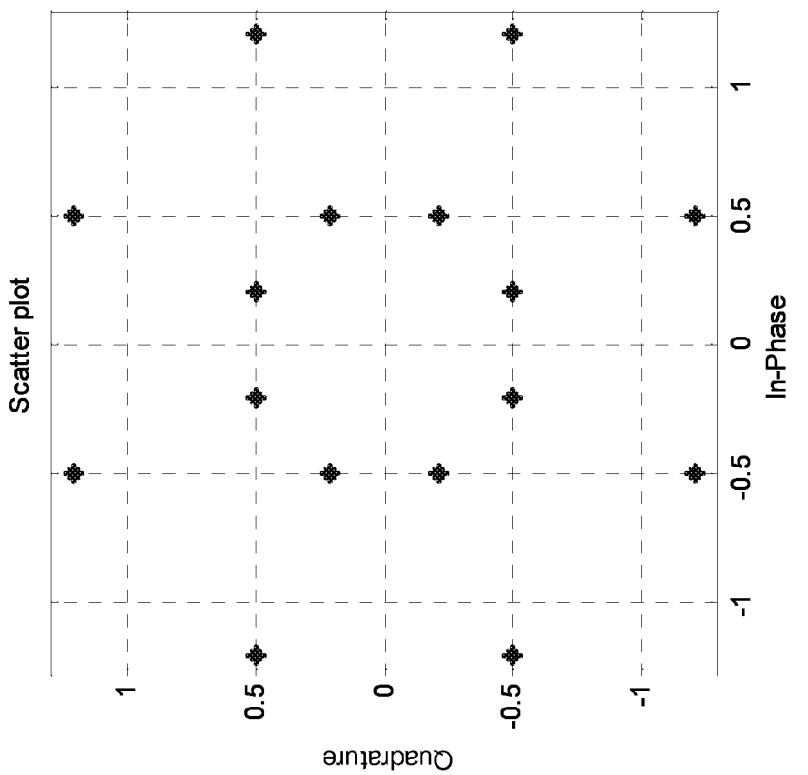
Figure 9C:
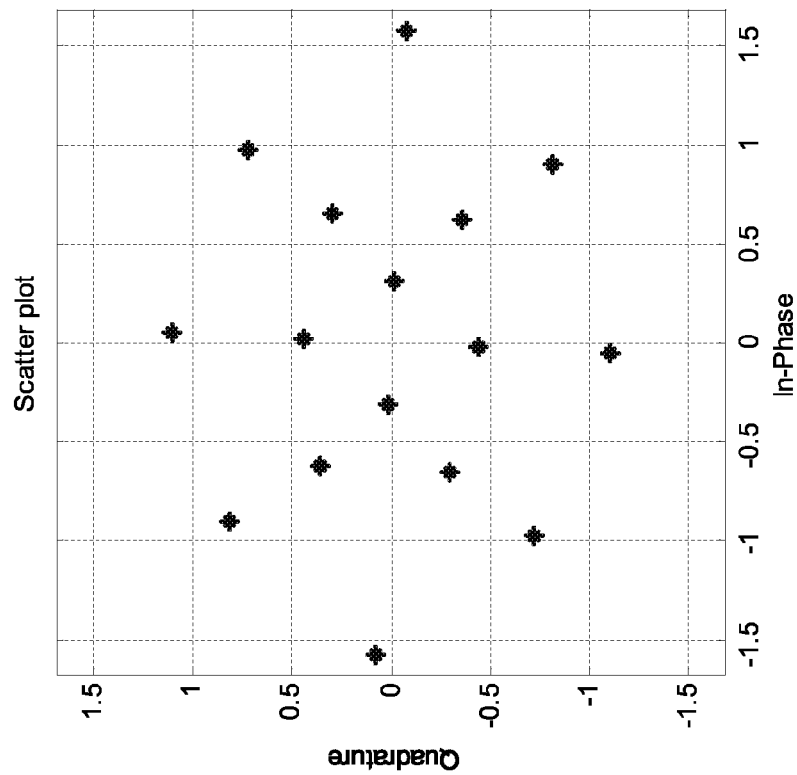

Reference is now made to FIGS. 9a, 9b, and 9c, which are simplified illustrations of optimal superimposed (JCMA) constellations for N=4, BPSK and SNR values of 10 dB, 12 dB, and 15 dB, respectively, according to a preferred embodiment of the present invention.

FIGS. 9a, 9b, and 9c depict superimposed constellations for x=[−1,1], for four mobile stations (N=4) and for SNR values of 10 dB, 12 dB, and 15 dB, respectively.

Reference is now made to FIGS. 10a, 10b, 10c, and FIG. 10d, which are simplified illustrations of optimal superimposed (JCMA) constellations for N=5, BPSK (2QAM) and SNR values of 2 dB, 5 dB, 10 dB, and 16 dB, respectively, according to a preferred embodiment of the present invention.

Figure 10A:
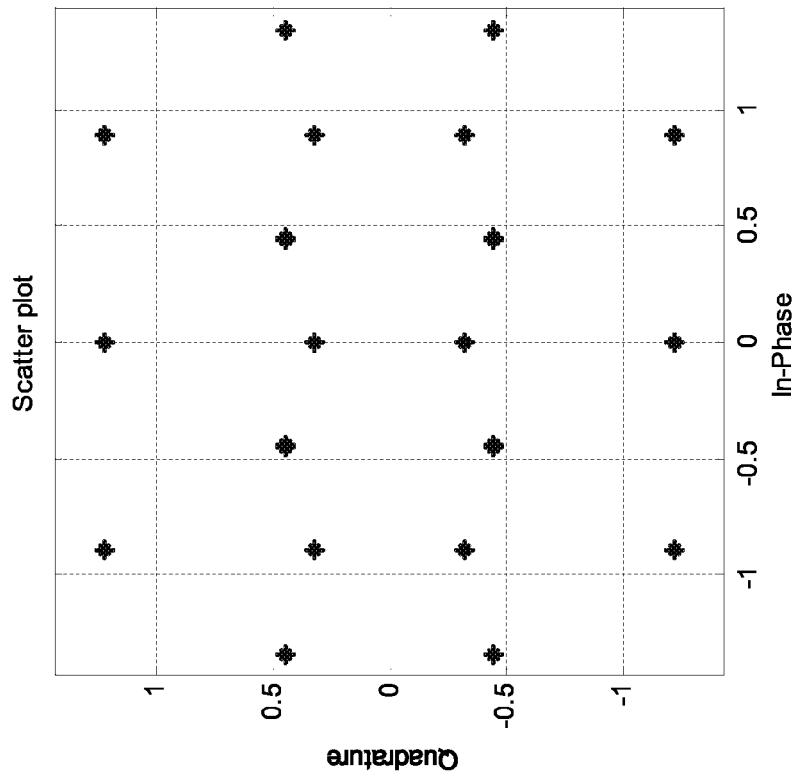
FIGS. 10a, 10b, 10c, and FIG. 10d, which are simplified illustrations of optimal superimposed (JCMA) constellations for N=5, BPSK (2QAM) and SNR values of 2 dB, 5 dB, 10 dB, and 16 dB, respectively.
Figure 10C:
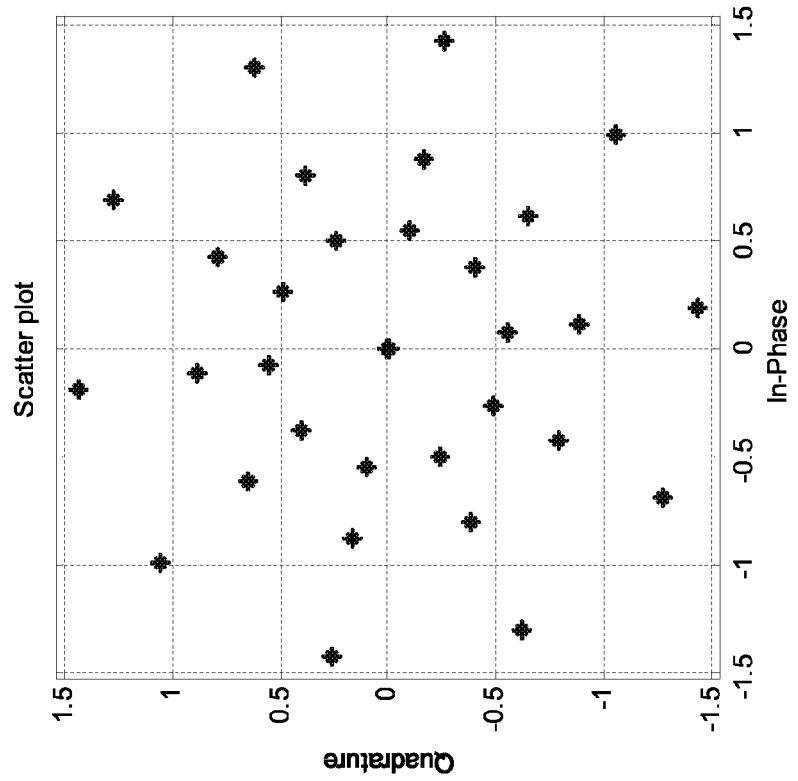
Figure 10B:
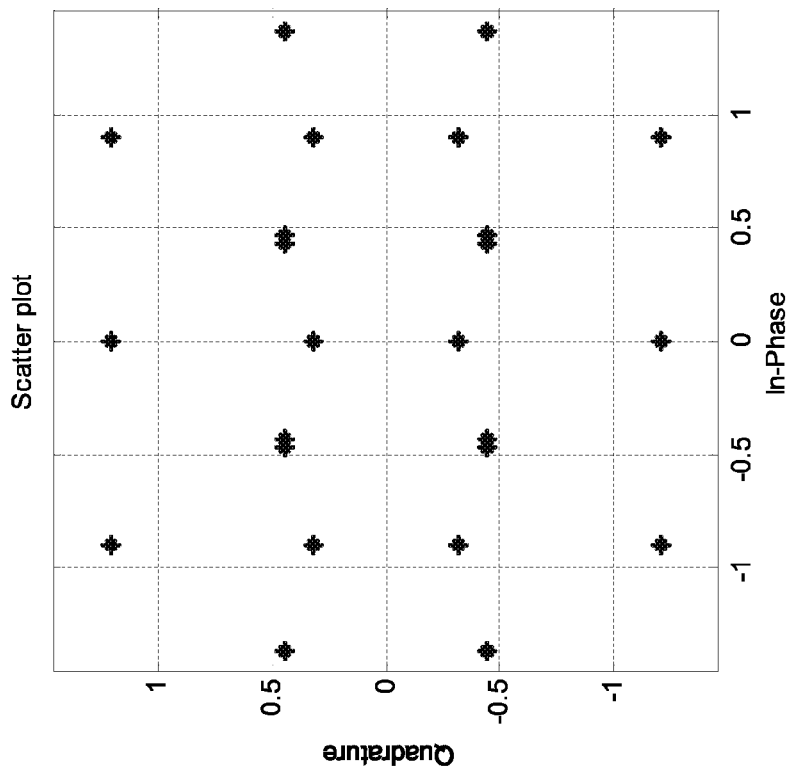

FIGS. 10a, 10b, and 10c depict superimposed constellations for x=[−1,1], for five mobile stations (N=5) and for SNR values of 2 dB, 5 dB, 10 dB, and 16 dB, respectively.

Figure 11:
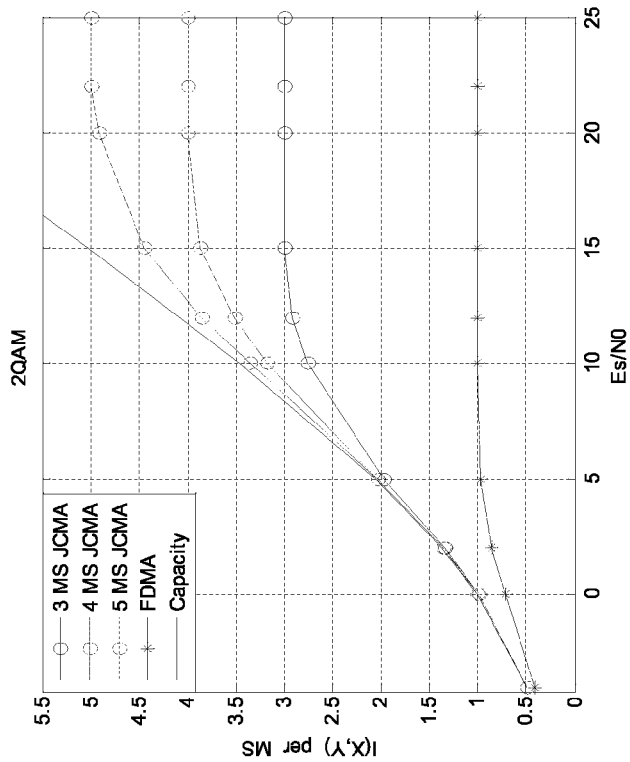
FIG. 11 is a simplified illustration of maximum sum-rate spectral efficiency vs. SNR for various Max-I based JCMA constellations.
Figure 10D:
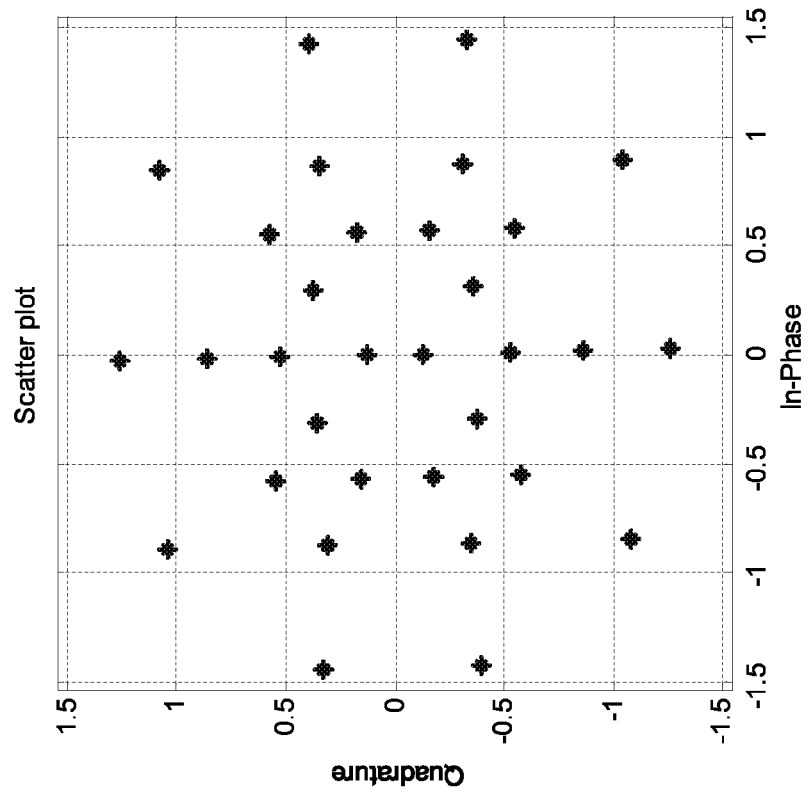

Reference is now made to FIG. 11, which is a simplified illustration of maximum sum-rate spectral efficiency vs. SNR for various Max-I based JCMA constellations according to a preferred embodiment of the present invention.

FIG. 11 shows the maximum sum-rate spectral efficiency vs. SNR for x=[−1,1]. FIG. 11 shows the overall sum-rate spectral efficiency in bits/sec/Hz vs. SNR for the proposed multiuser modulation as well as for the standard frequency-division multiplexing (FDMA). In FDMA the average power is kept constant assuming averaging is taken over all three users frames.

There are many examples in the literature for the multiple-access channel that demonstrate the advantage of simultaneous transmission over time-sharing. Indeed, the superiority of superposition modulation over frequency-sharing is clearly evident from FIG. 11: the FDMA sum-rate cannot exceed the single user rate which is 1 bit/sec/Hz for BPSK or 2 bit/sec/Hz for QPSK (4QAM). By appropriate alignment of the constellations the sum rate, at high SNR, increases by factor of N.

Figure 12B:
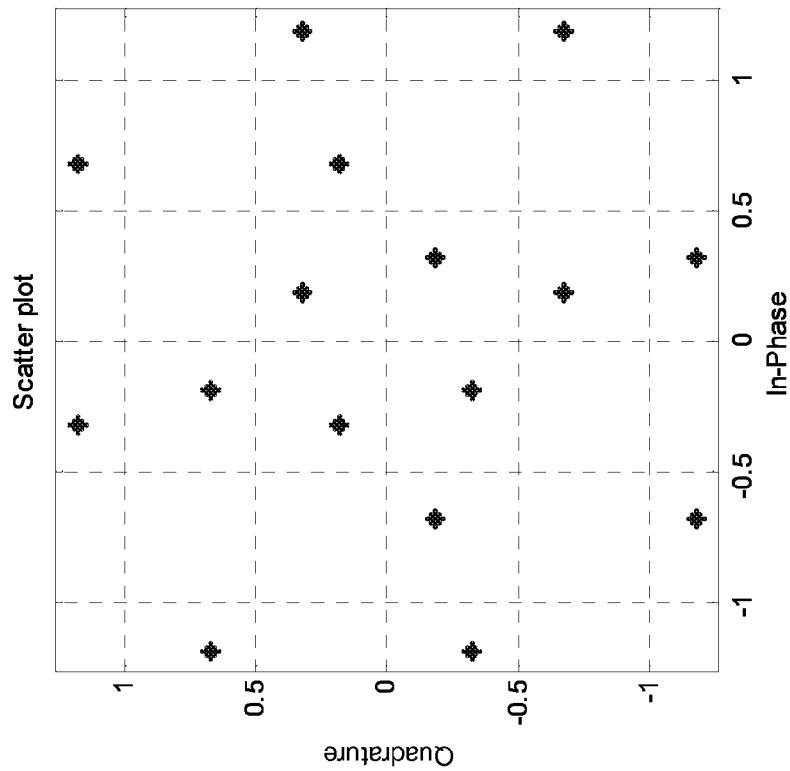
FIGS. 12a, and 12b, which are simplified illustrations of optimal superimposed (JCMA) constellations for N=2, QPSK and SNR values of 15 dB and 20 dB, respectively.
Figure 12A:
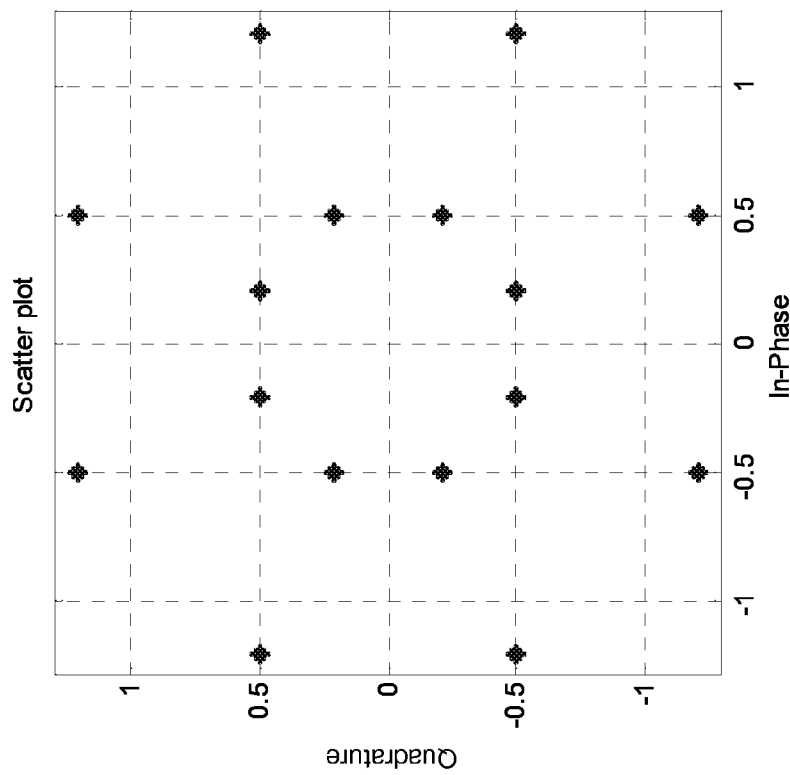

Reference is now made to FIGS. 12*a*, and 12*b*, which are simplified illustrations of optimal superimposed (JCMA) constellations for N=2, QPSK and SNR values of 15 dB and 20 dB, respectively, according to a preferred embodiment of the present invention.

FIGS. 12*a*, 12*b* depict superimposed constellations for x=[−1,1,j,−j], for two mobile stations (N=2) and for SNR values of 15 dB, and 20 dB, respectively.

Figure 13B:
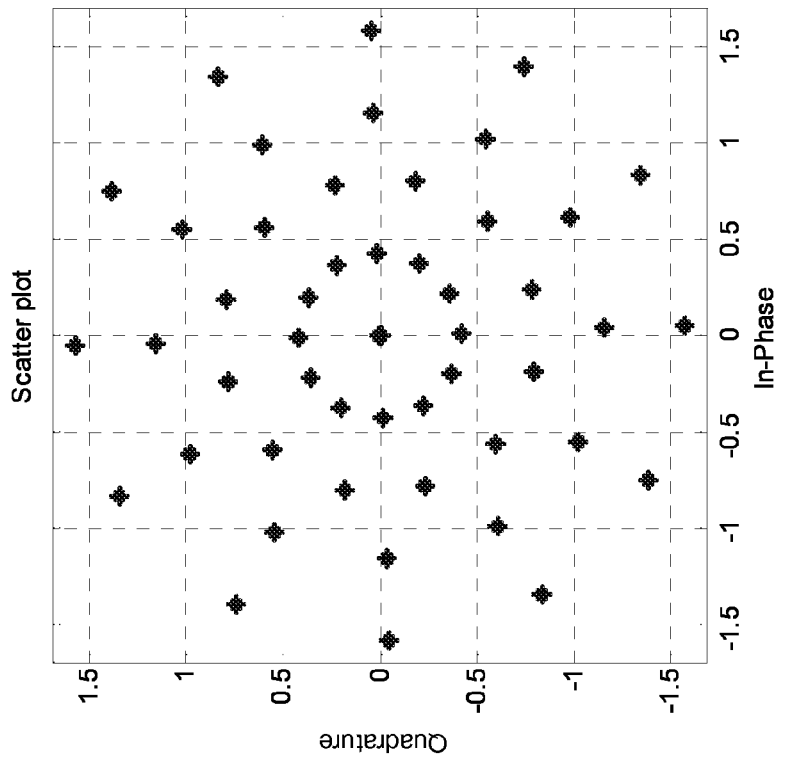
FIGS. 13a, 13b, and 13c, which are simplified illustrations of optimal superimposed (JCMA) constellations for N=3, QPSK and SNR values of 5 dB, 10 dB, and 20 dB, respectively.
Figure 13A:
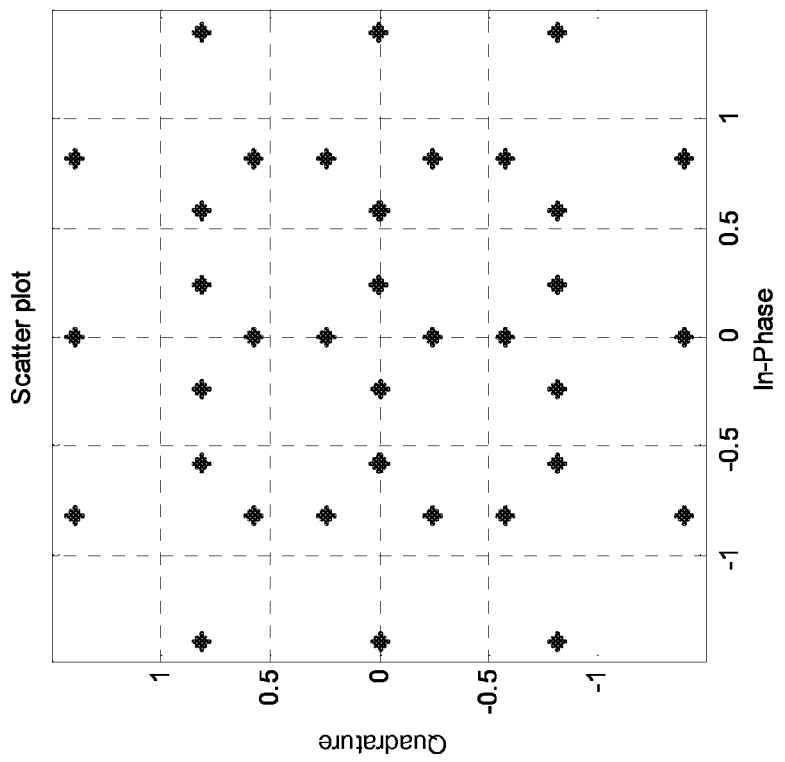
Figure 13C:
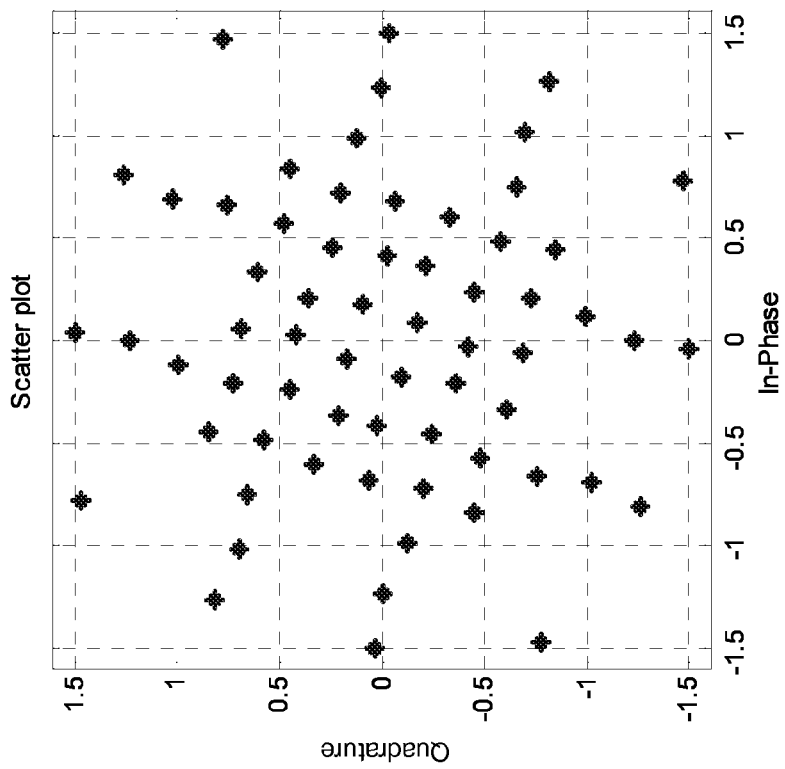

Reference is now made to FIGS. 13*a*, 13*b*, and 13*c*, which are simplified illustrations of optimal superimposed (JCMA) constellations for N=5, BPSK and SNR values of 5 dB, 10 dB, and 20 dB, respectively, according to a preferred embodiment of the present invention.

FIGS. 13*a*, 13*b*, and 13*c* depict superimposed constellations for x=[−1,1,j,−j], for three mobile stations (N=3) and for SNR values of 5 dB, 10 dB, and 20 dB, respectively.

Figure 14:
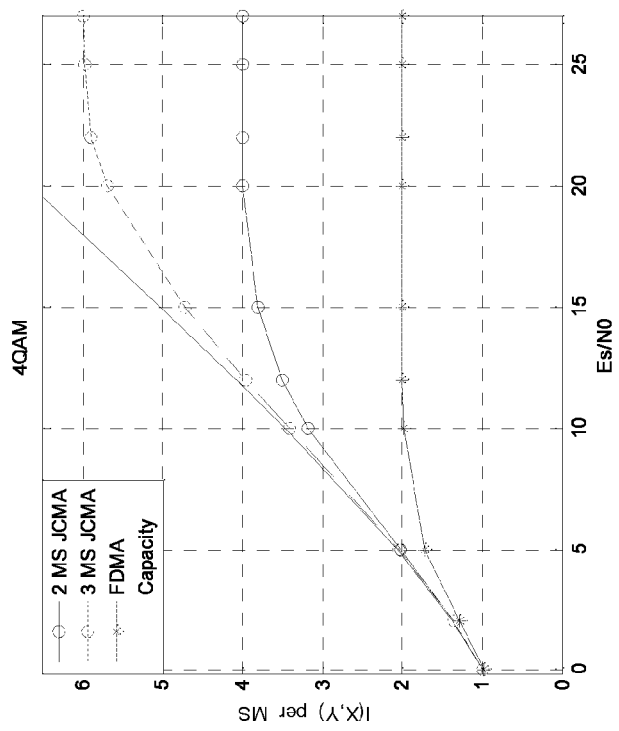
FIG. 14 is a simplified illustration of maximum sum-rate spectral efficiency vs. SNR for various Max-I based JCMA constellations.

Reference is now made to FIG. 14, which is a simplified illustration of maximum sum-rate spectral efficiency vs. SNR for various Max-I based JCMA constellations according to a preferred embodiment of the present invention.

FIG. 14 shows the maximum sum-rate spectral efficiency vs. SNR for x=[−1,1,j,−j]. FIG. 14 shows the overall sum-rate spectral efficiency in bits/sec/Hz vs. SNR for the proposed multiuser modulation as depicted in FIGS. 12*a*, 12*b* and FIGS. 13*a*, 13*b*, and 13*c* as well as for the standard frequency-division multiplexing (FDMA)

It is shown that the use of synchronized superposition-modulation with coding in FDMA systems results in an increase of spectral efficiency. Three example scenarios were investigated: a two-user scenario with an arbitrary QPSK superimposed constellation coupled with BCH coding, three, four and five-user BPSK scenario with mutual-information optimization and two, three-users QPSK scenario with mutual-information optimization.

For the two-user scenario an SNR gain of 2 dB for SNR higher than 8 dB was observed.

For the sum-rate mutual-information optimization was shown to be achieved when both power and phase of the different users are synchronized. The obtained sum-rate was shown to depend on SNR with a possible N-fold gain in sum-rate compared to FDMA. For high SNR mutual-information optimization scenario was numerically shown to be equivalent to optimizing the maximum minimal Euclidean distance. In addition, achieving maximum sum-rate required some of the users to sacrifice their individual rate. However, this also allows for extending their battery life while maintaining maximal sum-rate. For low SNR the optimal superimposed constellation was shown to be a lattice where performance is governed by the second smallest Euclidean distance.

Spectral efficiency is expected to grow substantially if more transmitters would be synchronized to form larger superimposed signal constellations and advanced coding techniques such as turbo codes and low density parity check codes would be used. Our ongoing research includes practical means of implementing JCMA based on synchronized SM with advanced coding schemes and high order superimposed signal constellations in emerging wireless standards such as LTE of UMTS.

It is further noted that pilot signal energy should be sent over the uplink sub-band from receiver to transmitters and the energy of the pilot signal should be directly proportional to the number of transmitters. Recent work (G. R. Tsouri and D. Wulich, referenced above) provided simple signal piloting rules for achieving accurate synchronization and power control of transmitters in SM scenarios.

What is claimed is:

1. In a JCMA communication system having a processor, a receiver and a transmitter, a method for communication, the method comprising:
   calculating a JCMA constellation for use in said JCMA communication system; and
   communicating data within said JCMA communication system using said JCMA constellation,
   wherein said step of calculating said JCMA constellation uses maximum sum-rate mutual information criterion,
   wherein any of said steps of calculating and communicating are performed by any of said processor, receiver and transmitter, and
   wherein said maximum mutual information is calculated according to:

$$I(X;Y) = \int_{x \in X} \int_{y \in Y} p(x,y) \log_2 \frac{p(x,y)}{p(x)p(y)} \, dx \, dy,$$

wherein X is a transmitter transmitting at least a part of said JCMA constellation and Y is a receiver receiving said JCMA constellation,
   wherein I(X, Y) is a mutual information function, and
   wherein p(x, y) is the joint probability density function for X and Y, and p(·) is the marginal probability density functions for X and Y respectively.

2. The method according to claim 1, wherein said constellation calculated using said maximum sum-rate mutual information criterion provides at least one of
   optimal spectral efficiency,
   optimal bit-rate, and
   optimal transmission power.

3. The method according to claim 1, additionally comprising the steps of:
   using said maximum sum-rate mutual information criterion, calculating a plurality of JCMA constellations, wherein each constellation is optimal for a combination comprising at least two of:
   i. a number of transmitters participating in said JCMA constellation,
   ii. a value of Signal-to-Noise Ratio (SNR) at a receiver of said JCMA constellation, and
   iii. at least one modulation scheme.

4. The method according to claim 3, additionally comprising the step of:
   distributing said plurality of JCMA constellations to at least one of a receiver and a transmitter.

5. The method according to claim 4, additionally comprising the steps of:
   at a receiver of said JCMA constellation performing the steps of:
   i. selecting a plurality of transmitters to form a group of transmitters for jointly transmitting a JCMA constellation,
   ii. measuring the combined SNR value for said group of transmitters,
   iii. selecting a JCMA constellation from said plurality of JCMA constellations according to at least two of: the number N of transmitters in said group of transmitters, said SNR value, and at least one modulation scheme, and
   iv. informing the selected constellation to said group of transmitters.

6. The method according to claim 5 wherein said step of selecting a JCMA constellation comprises calculating said JCMA constellation using said maximum sum-rate mutual information criterion at said receiver.

7. The method according to claim 5 wherein said step of selecting a JCMA constellation comprises the steps of:
   calculating a plurality of said JCMA constellations offline, using said maximum sum-rate mutual information criterion;
   distributing said plurality of JCMA constellations to at least one of a receiver and a transmitter; and
   in at least one of said receiver and said transmitter, selecting a JCMA constellation from said plurality of JCMA constellations according to at least two of:
   a number N of transmitters in a group of transmitters,
   said SNR value, and
   at least one modulation scheme.

8. The method according to claim 5, additionally comprising the steps of:
   receiving a constellation from said receiver;
   receiving a pilot signal from said receiver;
   at a transmitter of said group of transmitters, calculating at least one of transmission power P and constellation rotation angle θ according to said pilot signal; and
   transmitting at least one JCMA constellation component to said receiver using said P and said θ.

9. The method according to claim 1, wherein said receiver is at least one of a base-station, an access point, a satellite, and a satellite ground station.

10. In a JCMA communication system having a processor, a receiver and a transmitter, a method for communication, the method comprising:
    calculating a JCMA constellation for use in said JCMA communication system; and
    communicating data within said JCMA communication system using said JCMA constellation,
    wherein said step of calculating said JCMA constellation uses maximum sum-rate mutual information criterion,
    wherein any of said steps of calculating and communicating are performed by any of said processor, receiver and transmitter, and
    wherein said maximum sum-rate mutual information is calculated according to:

$$[P,\theta] = \arg\max_{P_n \in [0,1], \theta_n \in [0,180°], n=1,2,\ldots,N} I(X_1, X_2, \ldots, X_N; Y)$$

wherein N is number of transmitters using said constellation,
   wherein $P_n$ is average transmission power for transmitter n,
   wherein $\theta_n$ right rotation of said constellation for transmitter n,
   wherein I is a mutual information function,
   wherein $X_n$ is a transmitted constellation for transmitter n, and
   wherein Y is a receiver.

11. The method according to claim 10, wherein said constellation calculated using said maximum sum-rate mutual information criterion provides at least one of
    optimal spectral efficiency,
    optimal bit-rate, and
    optimal transmission power.

12. The method according to claim 10, additionally comprising the steps of:
    using said maximum sum-rate mutual information criterion, calculating a plurality of JCMA constellations, wherein each constellation is optimal for a combination comprising at least two of:
    i. a number of transmitters participating in said JCMA constellation,
    ii. a value of Signal-to-Noise Ratio (SNR) at a receiver of said JCMA constellation, and
    iii. at least one modulation scheme.

13. The method according to claim 12, additionally comprising the step of:
    distributing said plurality of JCMA constellations to at least one of a receiver and a transmitter.

14. The method according to claim 13, additionally comprising the steps of:
    at a receiver of said JCMA constellation performing the steps of:
    i. selecting a plurality of transmitters to form a group of transmitters for jointly transmitting a JCMA constellation,
    ii. measuring the combined SNR value for said group of transmitters,
    iii. selecting a JCMA constellation from said plurality of JCMA constellations according to at least two of: the number N of transmitters in said group of transmitters, said SNR value, and at least one modulation scheme, and
    iv. informing the selected constellation to said group of transmitters.

15. The method according to claim 14 wherein said step of selecting a JCMA constellation comprises calculating said JCMA constellation using said maximum sum-rate mutual information criterion at said receiver.

16. The method according to claim 14 wherein said step of selecting a JCMA constellation comprises the steps of:
    calculating a plurality of said JCMA constellations offline, using said maximum sum-rate mutual information criterion;
    distributing said plurality of JCMA constellations to at least one of a receiver and a transmitter; and
    in at least one of said receiver and said transmitter, selecting a JCMA constellation from said plurality of JCMA constellations according to at least two of:
    a number N of transmitters in a group of transmitters,
    said SNR value, and
    at least one modulation scheme.

17. The method according to claim 14, additionally comprising the steps of:
    receiving a constellation from said receiver;
    receiving a pilot signal from said receiver;
    at a transmitter of said group of transmitters, calculating at least one of transmission power P and constellation rotation angle θ according to said pilot signal; and
    transmitting at least one JCMA constellation component to said receiver using said P and said θ.

18. The method according to claim 10, wherein said receiver is at least one of a base-station, an access point, a satellite, and a satellite ground station.

19. In a JCMA communication system having a processor, a receiver and a transmitter, a method for communication, the method comprising:
    calculating a JCMA constellation for use in said JCMA communication system;
    selecting a JCMA constellation from a plurality of JCMA constellations wherein for said selected JCMA constellation the value of S is maximal, wherein S is given by:

$$S[\underline{x}^{(1)}, \underline{x}^{(2)}, \ldots, \underline{x}^{(N)}] = \sum_{n=1}^{N} I_n(\underline{x}^{(n)}),$$

-continued wherein $$I_n(\underline{x}^{(n)}) = \sum_{i=1}^{M} \int_{-\infty}^{\infty} p(y/x_i^{(n)}) P(x_i^{(n)}) \log_2 \frac{p(y/x_i^{(n)})}{p(y)} \, dy, \text{ and}$$

wherein $p(y/x_i^{(n)}) = \frac{1}{\sqrt{2\pi\sigma^2}} \exp\left\{-\frac{(y - x_i^{(n)})^2}{2\sigma^2}\right\}$; and communicating data within said JCMA communication system using said JCMA constellation;
wherein said step of calculating said JCMA constellation uses maximum sum-rate mutual information criterion,
wherein any of said steps of calculating and communicating are performed by any of said processor, receiver and transmitter.

20. The method according to claim 19, wherein said constellation calculated using said maximum sum-rate mutual information criterion provides at least one of
optimal spectral efficiency,
optimal bit-rate, and
optimal transmission power.

21. The method according to claim 19, additionally comprising the steps of:
using said maximum sum-rate mutual information criterion, calculating a plurality of JCMA constellations, wherein each constellation is optimal for a combination comprising at least two of:
i. a number of transmitters participating in said JCMA constellation,
ii. a value of Signal-to-Noise Ratio (SNR) at a receiver of said JCMA constellation, and
iii. at least one modulation scheme.

22. The method according to claim 21, additionally comprising the step of:
distributing said plurality of JCMA constellations to at least one of a receiver and a transmitter.

23. The method according to claim 22, additionally comprising the steps of:
at a receiver of said JCMA constellation performing the steps of:
i. selecting a plurality of transmitters to form a group of transmitters for jointly transmitting a JCMA constellation,
ii. measuring the combined SNR value for said group of transmitters,
iii. selecting a JCMA constellation from said plurality of JCMA constellations according to at least two of: the number N of transmitters in said group of transmitters, said SNR value, and at least one modulation scheme, and
iv. informing the selected constellation to said group of transmitters.

24. The method according to claim 23 wherein said step of selecting a JCMA constellation comprises calculating said JCMA constellation using said maximum sum-rate mutual information criterion at said receiver.

25. The method according to claim 23 wherein said step of selecting a JCMA constellation comprises the steps of:
calculating a plurality of said JCMA constellations offline, using said maximum sum-rate mutual information criterion;
distributing said plurality of JCMA constellations to at least one of a receiver and a transmitter; and
in at least one of said receiver and said transmitter, selecting a JCMA constellation from said plurality of JCMA constellations according to at least two of:
a number N of transmitters in a group of transmitters,
said SNR value, and
at least one modulation scheme.

26. The method according to claim 23, additionally comprising the steps of:
receiving a constellation from said receiver;
receiving a pilot signal from said receiver;
at a transmitter of said group of transmitters, calculating at least one of transmission power P and constellation rotation angle θ according to said pilot signal; and
transmitting at least one JCMA constellation component to said receiver using said P and said θ.

27. The method according to claim 19, wherein said receiver is at least one of a base-station, an access point, a satellite, and a satellite ground station.

28. A non-transitory computer readable media comprising JCMA constellations calculated using maximum sum-rate mutual information criterion calculated according to:

$$I(X;Y) = \int_{x \in X} \int_{y \in Y} p(x, y) \log_2 \frac{p(x, y)}{p(x)p(y)} \, dx \, dy,$$

wherein X is a transmitter transmitting at least a part of said JCMA constellation and Y is a receiver receiving said JCMA constellation,
wherein I(X, Y) is a mutual information function,
wherein p(x, y) is the joint probability density function for X and Y, and
p(·) is the marginal probability density functions for X and Y respectively, and
wherein said JCMA constellation is used for communicating data within said communication system.

29. A JCMA communication system comprising:
a processor;
a transmitter using JCMA constellation; and
a receiver using JCMA constellation;
wherein at least one of said processor, said transmitter and said receiver includes a Max-I JCMA constellation calculator operative to calculate a JCMA constellation for use in said JCMA communication system using maximum sum-rate mutual information criterion, and
wherein said maximum mutual information is calculated according to:

$$I(X;Y) = \int_{x \in X} \int_{y \in Y} p(x, y) \log_2 \frac{p(x, y)}{p(x)p(y)} \, dx \, dy,$$

wherein X is a transmitter transmitting at least a part of said JCMA constellation and Y is a receiver receiving said JCMA constellation,
wherein I(X, Y) is a mutual information function,
wherein p(x, y) is the joint probability density function for X and Y, and
p(·) is the marginal probability density functions for X and Y respectively, and
wherein said JCMA constellation is used for communicating data within said communication system.

30. A receiver in a JCMA communication system, said receiver comprising:

a storage module storing a look-up table (LUT) of Max-I optimized JCMA constellations; and a Max-I JCMA constellation selector to select and retrieve an appropriate Max-I JCMA constellation from said LUT, wherein said Max-I is calculated according to:

$$I(X;Y) = \int_{x \in X} \int_{y \in Y} p(x,y) \log_2 \frac{p(x,y)}{p(x)p(y)} dx dy,$$

wherein X is a transmitter transmitting at least a part of said JCMA constellation and Y is a receiver receiving said JCMA constellation, wherein I(X, Y) is a mutual information function, and wherein p(x, y) is the joint probability density function for X and Y, and p(·) is the marginal probability density functions for X and Y respectively.

31. The receiver according to claim 30, wherein said receiver is at least one of a base-station, an access point, a satellite, and a satellite ground station.

32. A transmitter in a JCMA communication system, said transmitter comprising:

a storage module storing a look-up table (LUT) of Max-I optimized JCMA constellations; and a receiver module for receiving a message containing at least one of a selected Max-I optimized JCMA constellation and an identification of a selected Max-I optimized JCMA constellation, wherein said maximum mutual information is calculated according to:

$$I(X;Y) = \int_{x \in X} \int_{y \in Y} p(x,y) \log_2 \frac{p(x,y)}{p(x)p(y)} dx dy,$$

wherein X is a transmitter transmitting at least a part of said JCMA constellation and Y is a receiver receiving said JCMA constellation, wherein I(X, Y) is a mutual information function, and wherein p(x, y) is the joint probability density function for X and Y, and p(·) is the marginal probability density functions for X and Y respectively.

33. A non-transitory computer readable media comprising JCMA constellations calculated using maximum sum-rate mutual information criterion calculated according to:

$$[P,\theta] = \arg\max_{P_n \in [0,1], \theta_n \in [0,180°], n=1,2,\ldots,N} I(X_1, X_2, \ldots, X_N; Y),$$

wherein N is number of transmitters using said constellation, wherein $P_n$ is average transmission power for transmitter n, wherein $\theta_n$ right rotation of said constellation for transmitter n, wherein I is a mutual information function, wherein $X_n$ is a transmitted constellation for transmitter n, wherein Y is a receiver, and wherein said JCMA constellation is used for communicating data within said communication system.

34. A non-transitory computer readable media comprising JCMA constellations selected from a plurality of JCMA constellations wherein for said selected JCMA constellation the value of S is maximal, wherein S is given by:

$$S[x^{(1)}, x^{(2)}, \ldots, x^{(N)}] = \sum_{n=1}^{N} I_n(x^{(n)}),$$

wherein $$I_n(x^{(n)}) = \sum_{i=1}^{M} \int_{-\infty}^{\infty} p(y/x_i^{(n)}) P(x_i^{(n)}) \log_2 \frac{p(y/x_i^{(n)})}{p(y)} dy,$$

wherein $$p(y/x_i^{(n)}) = \frac{1}{\sqrt{2\pi\sigma^2}} \exp\left\{-\frac{(y - x_i^{(n)})^2}{2\sigma^2}\right\}, \text{ and}$$

wherein said JCMA constellation is used for communicating data within said communication system.

35. A JCMA communication system comprising:
a processor;
a transmitter using JCMA constellation; and
a receiver using JCMA constellation,
wherein at least one of said processor, said transmitter and said receiver includes a Max-I JCMA constellation calculator operative to calculate a JCMA constellation for use in said JCMA communication system using maximum sum-rate mutual information criterion,
wherein calculating said JCMA constellation uses maximum sum-rate mutual information criterion, and
wherein said maximum sum-rate mutual information is calculated according to:

$$[P,\theta] = \arg\max_{P_n \in [0,1], \theta_n \in [0,180°], n=1,2,\ldots,N} I(X_1, X_2, \ldots, X_N; Y)$$

wherein N is number of transmitters using said constellation, wherein $P_n$ is average transmission power for transmitter n, wherein $\theta_n$ right rotation of said constellation for transmitter n, wherein I is a mutual information function, wherein $X_n$ is a transmitted constellation for transmitter n, wherein Y is a receiver, and wherein said JCMA constellation is used for communicating data within said communication system.

36. A JCMA communication system comprising:
a processor;
a transmitter using JCMA constellation; and
a receiver using JCMA constellation;
wherein at least one of said processor, said transmitter and said receiver includes a Max-I JCMA constellation calculator operative to calculate a JCMA constellation for use in said JCMA communication system using maximum sum-rate mutual information criterion, and
wherein for said selected JCMA constellation the value of S is maximal, wherein S is given by:

$$S[\underline{x}^{(1)}, \underline{x}^{(2)}, \ldots, \underline{x}^{(N)}] = \sum_{n=1}^{N} I_n(\underline{x}^{(n)}),$$

wherein $$I_n(x^{(n)}) = \sum_{i=1}^{M} \int_{-\infty}^{\infty} p(y/x_i^{(n)}) P(x_i^{(n)}) \log_2 \frac{p(y/x_i^{(n)})}{p(y)} dy,$$

wherein $$p(y/x_i^{(n)}) = \frac{1}{\sqrt{2\pi\sigma^2}} \exp\left\{-\frac{(y - x_i^{(n)})^2}{2\sigma^2}\right\}, \text{ and}$$

wherein said JCMA constellation is used for communicating data within said communication system.

37. A receiver in a JCMA communication system, said receiver comprising:
a storage module storing a look-up table (LUT) of Max-I optimized JCMA constellations; and
a Max-I JCMA constellation selector to select and retrieve an appropriate Max-I JCMA constellation from said LUT,
wherein calculating said JCMA constellation uses maximum sum-rate mutual information criterion, and
wherein said maximum sum-rate mutual information is calculated according to:

$$[P,\theta] = \arg\max_{P_n \in [0,1], \theta_n \in [0,180°], n=1,2,\ldots,N} I(X_1, X_2, \ldots, X_N; Y)$$

wherein N is number of transmitters using said constellation,
wherein $P_n$ is average transmission power for transmitter n,
wherein $\theta_n$ right rotation of said constellation for transmitter n,
wherein I is a mutual information function,
wherein $X_n$ is a transmitted constellation for transmitter n,
wherein Y is a receiver, and
wherein said JCMA constellation is used for communicating data within said communication system.

38. A receiver in a JCMA communication system, said receiver comprising:
a storage module storing a look-up table (LUT) of Max-I optimized JCMA constellations; and
a Max-I JCMA constellation selector to select and retrieve an appropriate Max-I JCMA constellation from said LUT,
wherein for said selected JCMA constellation the value of S is maximal, wherein S is given by:

$$S[x^{(1)}, x^{(2)}, \ldots, x^{(N)}] = \sum_{n=1}^{N} I_n(x^{(n)}),$$

wherein $$I_n(x^{(n)}) = \sum_{i=1}^{M} \int_{-\infty}^{\infty} p(y/x_i^{(n)}) P(x_i^{(n)}) \log_2 \frac{p(y/x_i^{(n)})}{p(y)} dy,$$

wherein $$p(y/x_i^{(n)}) = \frac{1}{\sqrt{2\pi\sigma^2}} \exp\left\{-\frac{(y - x_i^{(n)})^2}{2\sigma^2}\right\}, \text{ and}$$

wherein said JCMA constellation is used for communicating data within said communication system.

39. A transmitter in a JCMA communication system, said transmitter comprising:
a storage module storing a look-up table (LUT) of Max-I optimized JCMA constellations; and
a receiver module for receiving a message containing at least one of a selected Max-I optimized JCMA constellation and an identification of a selected Max-I optimized JCMA constellation,
wherein said Max-I is calculated according to:

$$[P,\theta] = \arg\max_{P_n \in [0,1], \theta_n \in [0,180°], n=1,2,\ldots,N} I(X_1, X_2, \ldots, X_N; Y)$$

wherein N is number of transmitters using said constellation,
wherein $P_n$ is average transmission power for transmitter n,
wherein $\theta_n$ right rotation of said constellation for transmitter n,
wherein I is a mutual information function,
wherein $X_n$ is a transmitted constellation for transmitter n, and
wherein Y is a receiver.

40. A transmitter in a JCMA communication system, said transmitter comprising:
a storage module storing a look-up table (LUT) of Max-I optimized JCMA constellations; and
a receiver module for receiving a message containing at least one of a selected Max-I optimized JCMA constellation and an identification of a selected Max-I optimized JCMA constellation,
wherein for said selected JCMA constellation the value of S is maximal, wherein S is given by:

$$S[x^{(1)}, x^{(2)}, \ldots, x^{(N)}] = \sum_{n=1}^{N} I_n(x^{(n)}),$$

wherein $$I_n(x^{(n)}) = \sum_{i=1}^{M} \int_{-\infty}^{\infty} p(y/x_i^{(n)}) P(x_i^{(n)}) \log_2 \frac{p(y/x_i^{(n)})}{p(y)} dy, \text{ and}$$

wherein $$p(y/x_i^{(n)}) = \frac{1}{\sqrt{2\pi\sigma^2}} \exp\left\{-\frac{(y - x_i^{(n)})^2}{2\sigma^2}\right\}.$$

* * * * *